United States Patent
Park et al.

(10) Patent No.: US 12,222,595 B2
(45) Date of Patent: Feb. 11, 2025

(54) OPTICAL FILM COMPRISING A FIRST SHEET HAVING A PYRAMID PATTERN LAYER AND BACKLIGHT UNIT HAVING THE SAME

(71) Applicant: LMS Co., Ltd., Pyeongtaek-si (KR)

(72) Inventors: Hyeonuk Park, Pyeongtaek-si (KR); Byeonghun Lee, Pyeongtaek-si (KR); Dongkyu Lee, Pyeongtaek-si (KR)

(73) Assignee: LMS Co., Ltd., Pyeongtaek-si (KR)

( * ) Notice: Subject to any disclaimer, the term of this patent is extended or adjusted under 35 U.S.C. 154(b) by 0 days.

(21) Appl. No.: 18/660,323

(22) Filed: May 10, 2024

(65) Prior Publication Data

US 2025/0004317 A1    Jan. 2, 2025

(30) Foreign Application Priority Data

Jun. 28, 2023  (KR) .................. 10-2023-0083671
May 9, 2024   (KR) .................. 10-2024-0061475

(51) Int. Cl.
*G02F 1/1335*  (2006.01)
*G02F 1/13357* (2006.01)

(52) U.S. Cl.
CPC .. *G02F 1/133504* (2013.01); *G02F 1/133615* (2013.01)

(58) Field of Classification Search
CPC ................................ G02F 1/133507
See application file for complete search history.

(56) References Cited

U.S. PATENT DOCUMENTS

| | | | |
|---|---|---|---|
| 2009/0073566 A1* | 3/2009 | Katsumoto | G02B 5/0278 359/619 |
| 2019/0049790 A1* | 2/2019 | Okabe | G02F 1/133504 |
| 2022/0163716 A1* | 5/2022 | Kim | G02B 5/0242 |
| 2022/0179264 A1* | 6/2022 | Chen | G02F 1/133603 |

FOREIGN PATENT DOCUMENTS

| | | | | |
|---|---|---|---|---|
| CN | 108227066 A | * | 6/2018 | ........... G02B 6/0016 |
| CN | 113376723 A | * | 9/2021 | ........... G02B 5/0242 |
| KR | 10-2017-0127983 A | | 11/2017 | |
| KR | 10-2022-0060922 A | | 5/2022 | |
| KR | 10-2023-0024718 A | | 2/2023 | |

* cited by examiner

*Primary Examiner* — Paul C Lee
(74) *Attorney, Agent, or Firm* — NKL LAW; Jae Youn Kim

(57) ABSTRACT

According to various embodiments of the present disclosure, an optical film comprises a first sheet including a pyramid pattern layer including a plurality of pyramid patterns and a first prism pattern layer including a plurality of first prisms patterns; a second sheet including a second prism pattern layer including a plurality of second prism patterns and a first diffusion layer; and a third sheet including a third prism pattern layer including a plurality of third prism patterns and a second diffusion layer.

14 Claims, 21 Drawing Sheets

| Content | Example 1-1 | Example 1-2 |
|---|---|---|
| Viewing Angle Distribution | Φ: 45° | |
| Optimal Incident Angle (θ) | 65° | 73° |
| Optimal Viewing Angle (Φ) | 45° | 45° |

FIG. 5B

| Content | Emitted Light | Example 2-1 | Example 2-2 | Example 2-3 |
|---|---|---|---|---|
| Viewing Angle Distribution | | | | |
| Ridge Direction of First Prism Pattern w.r.t. Arrangement Direction of Light Source | - | 90° | 90° | 90° |
| Refractive Index (n) of First Prism Pattern Layer | - | 1.49 | 1.58 | 1.69 |
| Incident Angle (θ) | - | -74° | -72° | -73° |
| Viewing Angle (Φ) | 90° | 60° | 54° | 53° |

FIG. 6B

| Content | Diffusion Plate |
|---|---|
| Viewing Angle Distribution 1 |  |
| Viewing Angle Distribution 2 |  |
| Brightness | 100% |
| Incident Angle (θ) | - |
| Viewing Angle (Φ) | - |

| Content | Example 3-1 | Example 3-2 | Example 3-3 |
|---|---|---|---|
| | Diff P nl. 49 | Diff P nl. 49 | Diff P nl. 49 |
| | Diff PY nl. 49 | Diff PY nl. 58 | Diff PY nl. 69 |
| Viewing Angle Distribution 1 |  |  |  |
| Viewing Angle Distribution 2 |  |  |  |
| Brightness | 124% | 125.2% | 105.8% |
| Incident Angle (θ) | -64(-74) | -58 | -52 |
| Viewing Angle (Φ) | 52(60) | 50 | 52 |

| Content | Example 3-4 | Example 3-5 | Example 3-6 |
|---|---|---|---|
| | Diff P nl. 69 | Diff P nl. 69 | Diff P nl. 69 |
| | Diff PY nl. 49 | Diff PY nl. 58 | Diff PY nl. 69 |
| Viewing Angle Distribution 1 |  |  |  |
| Viewing Angle Distribution 2 |  |  |  |
| Brightness | 118.5% | 120.6% | 113.8% |
| Incident Angle ($\theta$) | -72(-73) | -67 | -61 |
| Viewing Angle ($\Phi$) | 47(53) | 46 | 45 |

| Content | Example 4-1 | Example 4-2 | Example 4-3 | Example 4-4 |
|---|---|---|---|---|
| | P3 : 90° | P3 : 90° | P3 : 90° | P3 : 90° |
| | P1 : 90° | P1 : 75° | P1 : 60° | P1 : 45° |
| Viewing Angle Distribution 1 | | | | |
| Viewing Angle Distribution 2 | | | | |
| Brightness | 151.6% | 114.1% | 108.0% | 99.1% |
| Incident Angle Left (θ) | -63 | -60 | -59 | -69 |
| Viewing Angle Left (Φ) | 52 | 41 | 27 | 9 |
| Incident Angle Right (θ) | -61 | -64 | -64 | -63 |
| Viewing Angle Right (Φ) | 124 | 116 | 107 | 101 |

FIG. 9A

| Content | Example 4-5 | Example 4-6 | Example 4-7 | Example 4-8 |
|---|---|---|---|---|
| | P3 : 75° | P3 : 75° | P3 : 75° | P3 : 75° |
| | P1 : 90° | P1 : 75° | P1 : 60° | P1 : 45° |
| Viewing Angle Distribution 1 | | | | |
| Viewing Angle Distribution 2 | | | | |
| Brightness | 151.6% | 114.1% | 108.0% | 99.1% |
| Incident Angle Left (θ) | -63 | -60 | -59 | -69 |
| Viewing Angle Left (Φ) | 52 | 41 | 27 | 9 |
| Incident Angle Right (θ) | -61 | -64 | -64 | -63 |
| Viewing Angle Right (Φ) | 124 | 116 | 107 | 101 |

FIG. 9B

| Content | Example 4-9 | Example 4-10 | Example 4-11 | Example 4-12 |
|---|---|---|---|---|
| | P3 : 60° | P3 : 60° | P3 : 60° | P3 : 60° |
| | P1 : 90° | P1 : 75° | P1 : 60° | P1 : 45° |
| Viewing Angle Distribution 1 |  |  |  |  |
| Viewing Angle Distribution 2 |  |  |  |  |
| Brightness | 97.8% | 93.4% | 132.7% | 121.7% |
| Incident Angle Left (θ) | -63 | -60 | -59 | -69 |
| Viewing Angle Left (Φ) | 52 | 41 | 27 | 9 |
| Incident Angle Right (θ) | -61 | -64 | -64 | -63 |
| Viewing Angle Right (Φ) | 124 | 116 | 107 | 101 |

| Content | Example 4-13 | Example 4-14 | Example 4-15 | Example 4-16 |
|---|---|---|---|---|
| | P3 : 45° | P3 : 45° | P3 : 45° | P3 : 45° |
| | P1 : 90° | P1 : 75° | P1 : 60° | P1 : 45° |
| Viewing Angle Distribution 1 |  |  |  |  |
| Viewing Angle Distribution 2 |  |  |  |  |
| Brightness | 91.6% | 90.1% | 96.8% | 121.8% |
| Incident Angle Left (θ) | -63 | -60 | -59 | -69 |
| Viewing Angle Left (Φ) | 52 | 41 | 27 | 9 |
| Incident Angle Right (θ) | -61 | -64 | -64 | -63 |
| Viewing Angle Right (Φ) | 124 | 116 | 107 | 101 |

OPTICAL FILM COMPRISING A FIRST SHEET HAVING A PYRAMID PATTERN LAYER AND BACKLIGHT UNIT HAVING THE SAME

CROSS-REFERENCE TO RELATED APPLICATION(S)

This application is based on and claims priority under 35 U.S.C. 119 to Korean Patent Application No. 10-2023-0083671, filed on Jun. 28, 2023, and Korean Patent Application No. 10-2024-0061475, filed on May 9, 2024, in the Korean Intellectual Property Office, the disclosures of which are herein incorporated by reference in their entirety.

TECHNICAL FIELD

Various embodiments of the present specification relate to an optical film used for a liquid crystal display (LCD) device.

BACKGROUND

In general, a liquid crystal display (LCD) device may include a backlight unit that uniformly irradiates light across the entire screen of an electronic device. The backlight unit may include a light source, a light guide plate, a diffusion sheet, and an optical film including a prism sheet. Light emitted from the light source is transmitted upward through the light guide plate and the light transmitted upward is diffused through the diffusion sheet and then transmitted to the liquid crystal panel through the optical film provided at the upper portion.

Display devices being developed recently are gradually becoming thinner, and accordingly, backlight units are also required to be manufactured in a thinner manner. For the backlight units, development is underway to eliminate relatively thick diffusion sheets. For example, research is being developed to remove or replace the diffusion sheet from embodiments of the backlight unit that include a light source, a light guide plate, a diffusion sheet, and a prism sheet.

The diffusion sheet may form a diffusion layer on one surface and/or the other surface of the diffusion sheet. The diffusion layer generally contains light diffuser beads. The diffusion sheet may also spread light provided from a light source and a light guide plate over a wider area than when the light is directed to the prism sheet while acting as a shielding sheet that lowers visibility to the light source.

Because the diffusion sheet is generally thick and has the disadvantage of improving the brightness of the backlight unit, efforts are being made to replace it.

In addition, when a sheet including a pyramid pattern and a reversed prism pattern is used instead of the diffusion sheet, a problem of moiré phenomenon may occur depending on the arrangement of the pyramid pattern and the reversed prism pattern.

Through various embodiments, the present disclosure may provide an optical film showing excellent performance in preventing the shape of the light source from being recognized (referred to as 'shielding performance') without using a thick diffusion sheet as well as showing higher brightness (referred to as 'brightness performance') for a liquid crystal display (LCD) device.

Additionally, when a sheet including a pyramid pattern and a reversed prism pattern is used instead of a diffusion sheet, various embodiments of an optical film for effectively avoiding the moiré phenomenon can be provided.

SUMMARY

An object of the present disclosure is to provide an optical film which may contribute to thinning of a backlight unit of a liquid crystal display (LCD) device by not providing a thick diffusion sheet because the optical film of the present disclosure has excellent shielding performance against a light source and excellent brightness performance.

Another object of the present disclosure is to provide an optical film which may reduce and/or prevent moiré phenomenon for a backlight unit of a liquid crystal display (LCD) device.

According to an embodiment of the invention, an optical film is provided to comprise a first sheet including a first base portion; a pyramid pattern layer including a plurality of pyramid patterns formed on a first surface of the first base portion where each pyramid pattern has a first pitch corresponding to a length of a first side of a pyramid base of the pyramid pattern and a first prime pitch corresponding to a diagonal length of the pyramid base of the pyramid pattern; and a first prism pattern layer including a plurality of first prisms patterns formed on a second surface of the first base portion where each first prism pattern has a second pitch corresponding to a prism base length of the first prism pattern; a second sheet including a second base portion; a second prism pattern layer including a plurality of second prism patterns formed on a first surface of the second base portion; and a first diffusion layer formed on a second surface of the second base portion where the first diffusion layer is disposed over the first sheet facing the pyramid pattern layer; and a third sheet including a third base portion; a third prism pattern layer including a plurality of third prism patterns formed on a first surface of the third base portion; and a second diffusion layer formed on a second surface of the third base portion where the second diffusion layer is disposed over the second sheet facing the second prism pattern layer where ridges of the plurality of the first prism patterns are formed along a first direction; a direction extended from the side of the pyramid base of the pyramid patterns forms an angle with the first direction in a range of 0° or greater and 45° or less; ridges of the plurality of the second prism patterns are formed along a second direction substantially perpendicular to the first direction; and ridges of the plurality of the third prism patterns are formed along a third direction substantially perpendicular to the second direction.

In an embodiment, the second sheet and the third sheet are laminated for the optical film.

In an embodiment, the first, the second sheet and the third sheet are laminated for the optical film.

In an embodiment, the first sheet refracts or reflects light incident to the second surface of second base portion of the second sheet with a predetermined angle for the optical film.

In an embodiment, an absolute value of a difference of a refractive index of the pyramid pattern layer and a refractive index of the first prism pattern layer is 0.2 or less for the optical film.

In an embodiment, the optical film satisfies either Formula 1 or Formula 2:

$$\frac{n \cdot (pi1 - 1)}{2} < pi2 < n \cdot pi1 \qquad \text{[Formula 1]}$$

or $$\frac{n \cdot (pi1 - 1)}{2} > pi2 \quad \text{[Formula 2]}$$

where "pi1" is the first pitch; "pi1-1" is the first prime; "pi2" is the second pitch; and "n" is a natural number.

According to another embodiment of the present disclosure, a backlight unit is provided to comprise a first sheet including a first base portion; a pyramid pattern layer including a plurality of pyramid patterns formed on a first surface of the first base portion where each pyramid pattern has a first pitch corresponding to a length of a first side of a pyramid base of the pyramid pattern and a first prime pitch corresponding to a diagonal length of the pyramid base of the pyramid pattern; and a first prism pattern layer including a plurality of first prisms patterns formed on a second surface of the first base portion where each first prism pattern has a second pitch corresponding to a prism base length of the first prism pattern; a second sheet including a second base portion; a second prism pattern layer including a plurality of second prism patterns formed on a first surface of the second base portion; and a first diffusion layer formed on a second surface of the second base portion where the first diffusion layer is disposed over the first sheet facing the pyramid pattern layer; and a third sheet including a third base portion; a third prism pattern layer including a plurality of third prism patterns formed on a first surface of the third base portion; and a second diffusion layer formed on a second surface of the third base portion where the second diffusion layer is disposed over the second sheet facing the second prism pattern layer where ridges of the plurality of the first prism patterns are formed along a first direction; a direction extended from the side of the pyramid base of the pyramid patterns forms an angle with the first direction in a range of 0° or greater and 45° or less; ridges of the plurality of the second prism patterns are formed along a second direction substantially perpendicular to the first direction; and ridges of the plurality of the third prism patterns are formed along a third direction substantially perpendicular to the second direction.

In another embodiment, the edge type light source is arranged in a fourth direction substantially perpendicular to the first direction and the edge type light source emits light substantially parallel to the first direction in the backlight unit.

In another embodiment, the edge type light source is arranged in the fourth direction; the first direction is tilted with a first angle from the fourth direction; and the third direction is substantially parallel to the first direction and tilted with a second angle which is substantially the same as the first angle from the fourth direction in the backlight unit.

In another embodiment, the optical film satisfies either Formula 3 or Formula 4:

$$\frac{n \cdot (pi1 - 1)}{2} < pi2 < n \cdot pi1 \quad \text{[Formula 3]}$$

or $$\frac{n \cdot (pi1 - 1)}{2} > pi2 \quad \text{[Formula 4]}$$

where "pi1" is the first pitch; "pi1-1" is the first prime; "pi2" is the second pitch; and "n" is a natural number in the backlight unit.

BRIEF DESCRIPTION OF THE DRAWINGS

The above-described or other aspects, configurations and/or advantages of an embodiment of the present disclosure may become clearer through the following detailed description with reference to the accompanying drawings.

FIG. 5B is a table showing a viewing angle distribution and an optimal incident angle for increasing light distribution and brightness according to an embodiment.

FIG. 6B is a table showing changes in Incident Angle and Viewing Angle with respect to changes in the refractive index of the reversed prism pattern layer.

FIG. 9A is a table showing optical characteristics of a liquid crystal display (LCD) device including an optical film according to an embodiment.

FIG. 9B is a table showing optical characteristics of a liquid crystal display (LCD) device including an optical film according to an embodiment.

Throughout the accompanying drawings, similar parts, components and/or structures may be assigned with similar reference numbers.

DETAILED DESCRIPTION

Figure 1:
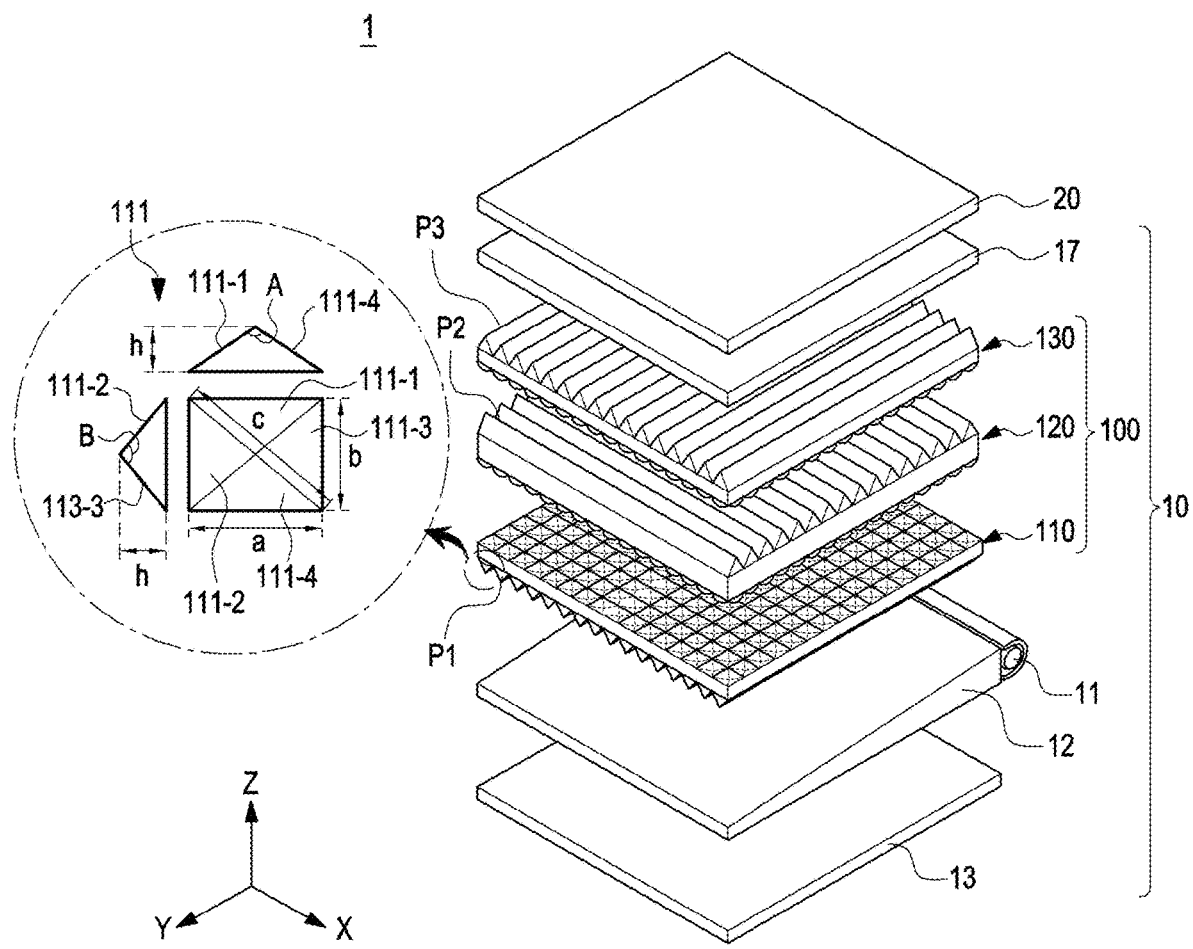
FIG. 1 is a perspective view showing a liquid crystal display (LCD) device including an optical film according to an embodiment.

Various embodiments and terms used in the specification are not intended to limit the technical features described in the specification to specific embodiments, but it should be understood to include various modifications, equivalents, or substitutions of the embodiments. In connection with the description of the drawings, similar reference numerals may be used for similar or related components. The singular form of the noun corresponding to the item may include one or more of the elements unless the relevant context clearly dictates otherwise.

According to various embodiments, each component (e.g., module or program) of the above-described components may include a single or plural entity, and some of the plurality of entities may be separately placed in other components. According to various embodiments, one or more of the components or operations described above may be omitted, or one or more other components or operations may be added. Multiple components (e.g., modules or programs) may be alternatively or additionally integrated into a single component. In this case, the integrated component may perform one or more functions of each component of the plurality of components in the same or similar manner as those performed by the corresponding component of the plurality of components prior to the integration. According to various embodiments, operations performed by a module, program, or other component may be executed sequentially, in parallel, iteratively, or heuristically, or one or more of the operations may be executed in a different order or omitted. Alternatively, one or more other operations may be added.

Various embodiments will be described with reference to the associating drawings. In describing the prevent embodiments, the same names and the same symbols are used for the same components, and additional description will be omitted. In addition, in describing embodiments of the present disclosure, it is clear in advance that the same names and same symbols are used for components having the same function, but that they are not substantially the same as the conventional ones.

According to various embodiments, terms such as "comprise" or "have" are intended to designate the presence of a feature, number, step, operation, component, part, or combination described in the specification. It should be understood, however, that the above does not preclude the possibility of addition or existence of one or more of other features, or numbers, steps, operations, components, parts, or combinations.

FIG. 1 is a perspective view showing a liquid crystal display (LCD) device including an optical film according to an embodiment. In the detailed description below, a longitudinal direction (a vertical direction) of a liquid crystal display (LCD) device 1 may be referred to as a 'Y-axis direction', a lateral direction (a horizontal direction) may be referred to as an 'X-axis direction', and/or a height direction (a thickness direction) may be referred to as a 'Z-axis direction.' Additionally, in some embodiments, the direction where a component is oriented may be referred to as 'negative/positive (−/+)' along with the orthogonal coordinate system illustrated in the drawing. As shown in FIG. 1, if the term 'negative/positive (−/+)' is not written in the orthogonal coordinate system, the coordinate axis may be interpreted as pointing in the +direction unless otherwise defined. For example, 'X-axis direction' can be interpreted as pointing to the +X-axis direction, and 'Y-axis direction' can be interpreted as pointing to the +Y-axis direction. 'Z-axis direction' can be interpreted as pointing to the +Z-axis direction. For example, referring to FIG. 1, if a second sheet 120 is disposed over a first sheet 110, it can be defined as being the second sheet 120 placed from the first sheet 110 on the '+Z axis direction.' For example, referring to FIG. 4A, it can be defined that one surface (e.g., a first side 112a) of a first base portion 112 is a surface facing the '+Z-axis direction and the other surface (e.g., a second surface 112b) is a surface facing the '−Z axis direction.' According to an embodiment, in the description of an optical film 100, the direction where light from the light source travels may be expressed as, for example, '+Z-axis direction.' In explaining the direction below, heading toward one of the three axes of the orthogonal coordinate system may include heading in a direction parallel to the axis. Note that this is based on the orthogonal coordinate system described in the drawings for brevity of explanation, and that the description of directions or components does not limit the various embodiments of the present specification.

Referring to FIG. 1, the liquid crystal display (LCD) device 1 may include a backlight unit 10 and a liquid crystal panel 20. According to various embodiments, the backlight unit 10 may face the rear surface (a surface facing the −Z-axis direction) of the liquid crystal panel 20 to emit light to the liquid crystal panel 20. The backlight unit 10 may include a light source 11, a light guide plate 12, a reflector 13, an optical film 100, and a diffusion sheet 18. The backlight unit 10 may further include a reflective polarizing sheet although not shown in the drawing.

The light source 11 is configured to emit light on the back of the liquid crystal panel 20 and may be placed on one side of the light guide plate (LGP) 12. The light source can be classified as an edge-type or a direct-type depending on the structure configuration and in the present disclosure, as shown in FIG. 1, an edge-type light source can be utilized. The light source 11 is configured to emit light to the back of the liquid crystal panel 20 and the light emitted from the light source 11 can be converted into a surface light source by the light guide plate 12. At this time, the light source 11 may be a cold cathode fluorescent lamp (CCFL) or an external electrode fluorescent lamp (EEFL). The reflector 13 is disposed behind the light guide plate 12 thereby reflecting the light emitted toward the rear of the light guide plate 12 (a surface facing the −Z-axis direction) to the light guide plate 12 and then, making it incident. As a result, the loss of light can be minimized. In other words, the reflector 13 can perform light recycling.

Referring to FIG. 1, the light emitted from the light guide plate 12 is incident to the optical film 100. The optical film 100 of the present disclosure may include at least one prism sheet for concentrating light and it may further include a sheet including a pyramid pattern as a sheet for uniformly dispersing the incident light from the light guide plate 12 and then making it incident to the prism sheet. For convenience of explanation, one prism sheet or a combination of two or more prism sheets for concentrating light included in the optical film 100 can be referred to as a 'concentrating prism sheet' (or 'cross prism sheet') and a sheet containing the pyramid pattern can be referred to as a 'pyramid sheet' in the following description.

As will be described in detail below, the optical film 100 of the present disclosure may include a first sheet 110 where a pyramid pattern is formed on one surface facing a direction parallel to the direction of travel of the light emitted from the light source (e.g., Z-axis direction) and a prism pattern (i.e., a reversed prism pattern) is formed on the other surface facing a direction opposite to the direction of travel of the light emitted from the light source as a pyramid sheet. In addition, the optical film 100 of the present disclosure may include a second sheet 120 where a prism pattern is formed on one side facing a direction parallel to the direction of travel of the light emitted from the light source (e.g., Z-axis direction) as a concentrating prism sheet. According to one embodiment, a diffusion layer may be formed on the other surface of the second sheet 120 facing a direction opposite to the direction of travel of the light emitted from the light source. According to one embodiment, the optical film 100 of the present disclosure may further include a third sheet 130 having a prism pattern where a direction of an ridge of the prism pattern is different to a direction of an ridge of the prism pattern formed on the second sheet 120 as a concentrating prism sheet other than the second sheet 120.

The concentrating prism sheet (the second sheet 120 and/or the third sheet 130) can collect incident light using an optical pattern formed on its surface and then emit it to the liquid crystal panel 20. The concentrating prism sheet (the second sheet 120 and/or the third sheet 130) may include a transparent base film and a prism pattern layer formed on an upper surface (a surface facing the +Z-axis direction) of the base film. The prism pattern layer may be formed as an optical pattern layer in the form of a triangular array with a lateral face at a specified inclination angle (for example, a lateral face with 45° inclination) to improve brightness in the plane direction. The prism patterns of the prism pattern layer may be in the shape of a triangular pillar and may be arranged so that one side of the triangular pillar faces the base film. The cross-section of each of the prism patterns may be triangular.

According to one embodiment, the concentrating prism sheet (the second sheet 120 and/or the third sheet 130) may include the second sheet 120 and the third sheet 130 to form a composite prism sheet structure. Here, the third sheet 130 may be arranged to overlap the second sheet 120. In the second sheet 120, a plurality of second prism patterns may be arranged side by side with each other. Each second prism pattern may have a structure extending in one direction. For example, the vertex lines (referred to as 'ridge' or 'crest') of each of the second prism patterns may be formed to extend toward the X-axis direction. Similarly, in the third sheet 130, a plurality of third prism patterns may also be arranged side by side with each other. Each of the third prism patterns may have a structure extending in one direction. For example, the ridges of each of the third prism patterns may be formed to extend toward the Y-axis direction which is perpendicular to the X-axis direction. Here, the extension direction of the first prism patterns and the extension direction of the second prism patterns are shown as facing the X-axis direction and Y-axis direction for convenience of explanation. However, it should be noted that it is not limited to the illustrated embodiment and may be oriented in a direction other than the X-axis direction or Y-axis direction.

According to one embodiment, a prism pattern (a plurality of first prism patterns) may also be formed on the pyramid sheet (the first sheet 110). The plurality of first prism patterns included in the first sheet 110 may be formed to be protruded to a reversed direction of the direction of travel of light (−Z-axis direction) unlike the plurality of second prism patterns included in the second sheet 120 and the plurality of third prism patterns included in the third sheet 130 where they are protruded to a direction parallel to the direction of travel of light (+Z-axis direction). Accordingly, the plurality of first prism patterns included in the first sheet 110 may be referred to as 'reversed prism patterns.' The ridge direction P1 of the plurality of first prism patterns may be formed the same as or different from the ridge direction P2 of the plurality of second prism patterns and the ridge direction P3 of the plurality of third prism patterns. According to one embodiment, as shown in FIG. 1, the ridge direction P1 of the plurality of first prism patterns may be perpendicular to the ridge direction P2 of the plurality of second prism patterns and may be parallel to the ridge direction P3 of the plurality of third prisms. The liquid crystal display (LCD) device 1 of the present disclosure may enjoy associating effects. A more detailed explanation regarding the ridge direction of the prism patterns will be provided later.

The diffusion sheet 17 can uniformly disperse light incident from the optical film 100. The diffusion sheet 17 where curable resin solution (e.g., urethane acrylate, epoxy acrylate, ester acrylate, or at least one selected from or mixed of ester acrylate and radical generating monomer) added with light diffusion beads is deposited can induce light diffusion by the light diffusion beads. In addition, the diffusion sheet 17 may be formed a protrusion pattern (or a protrusion portion) having uniform or non-uniform size of shape (e.g., spherical, hemispherical, or elliptical) to promote the diffusion of light. According to some conventional embodiments, the diffusion sheet 17 may further include the upper diffusion sheet 17 disposed over the concentrating prism sheet disclosed in FIG. 1 as well as the lower diffusion sheet disposed below the concentrating prism sheet. However, in the present specification, the lower diffusion sheet can be replaced by providing an optical film 100 where the concentrating prism sheet and the pyramid sheet are combined.

According to the embodiment, at least one of the above-described components (e.g., the diffusion sheet 17) may be omitted from or one or more other components (e.g., a reflective polarizing sheet (not shown)) may be added to the backlight unit 10.

Because the reflective polarizing sheet (not shown) may be provided on the top of the optical film 100 and the diffusion sheet 17, it may play a role to transmit some polarized light of light concentrated from the optical film 100 and diffused by the upper diffusion sheet 17 and to reflect other polarized light to the lower part.

The liquid crystal panel 20 can refract light emitted from the light source 11 into a predetermined pattern according to an electrical signal. The refracted light may pass through a color filter and a polarizing filter disposed on the front of the liquid crystal panel 20 to construct an image.

Components included in the liquid crystal display (LCD) device 1 of FIG. 1 may be assembled with other components in an overlapped and stacked fashion in a height direction (+Z-axis direction). For example, in the liquid crystal display (LCD) device 1 according to a certain embodiment as shown in FIG. 1, the individually manufactured backlight unit 10 and the liquid crystal panel 20 may be overlapped and stacked in the height direction (+Z-axis direction).

Figure 2:
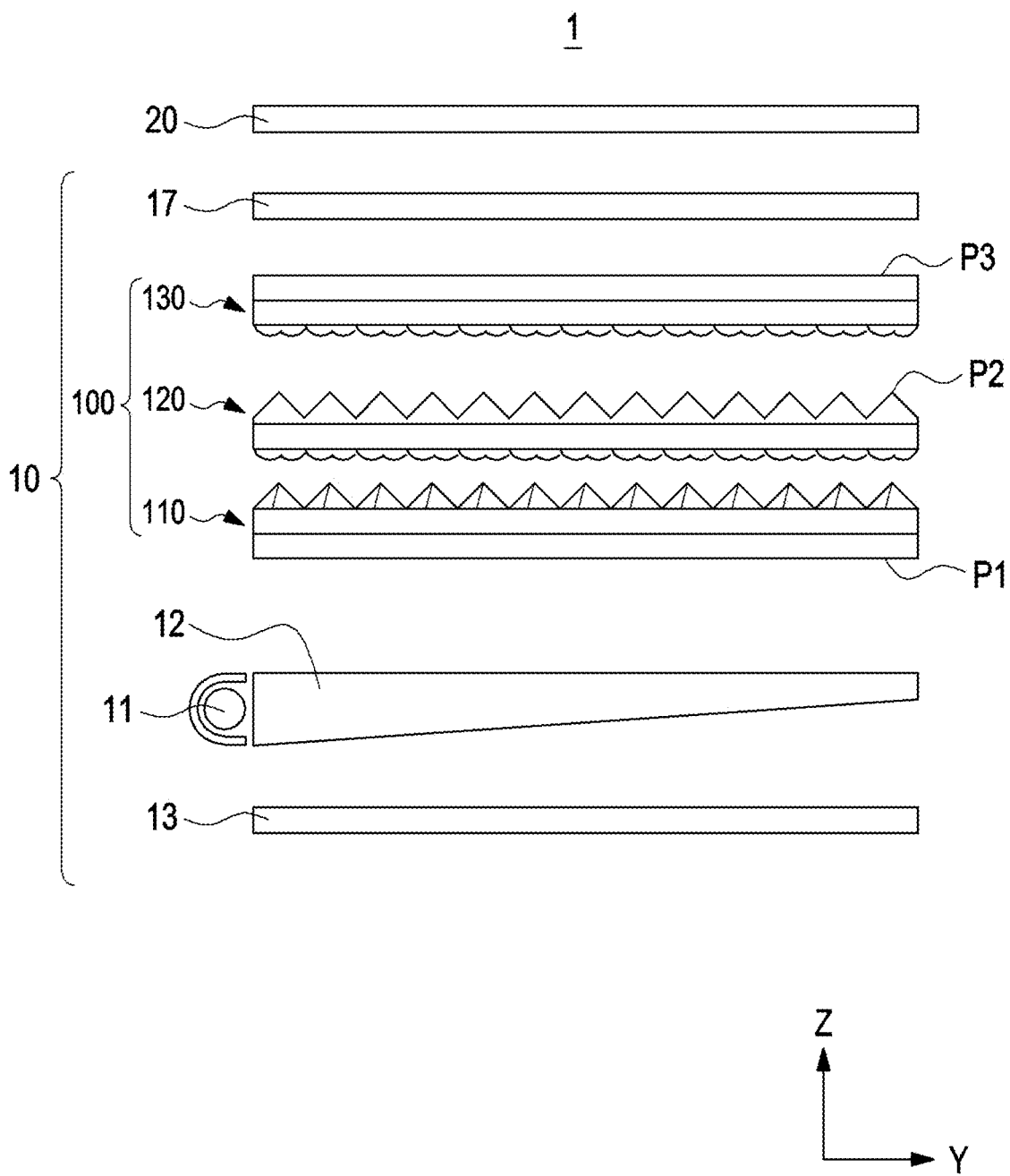
FIG. 2 is a drawing illustrating a liquid crystal display (LCD) device including an optical film according to an embodiment.
Figure 3:
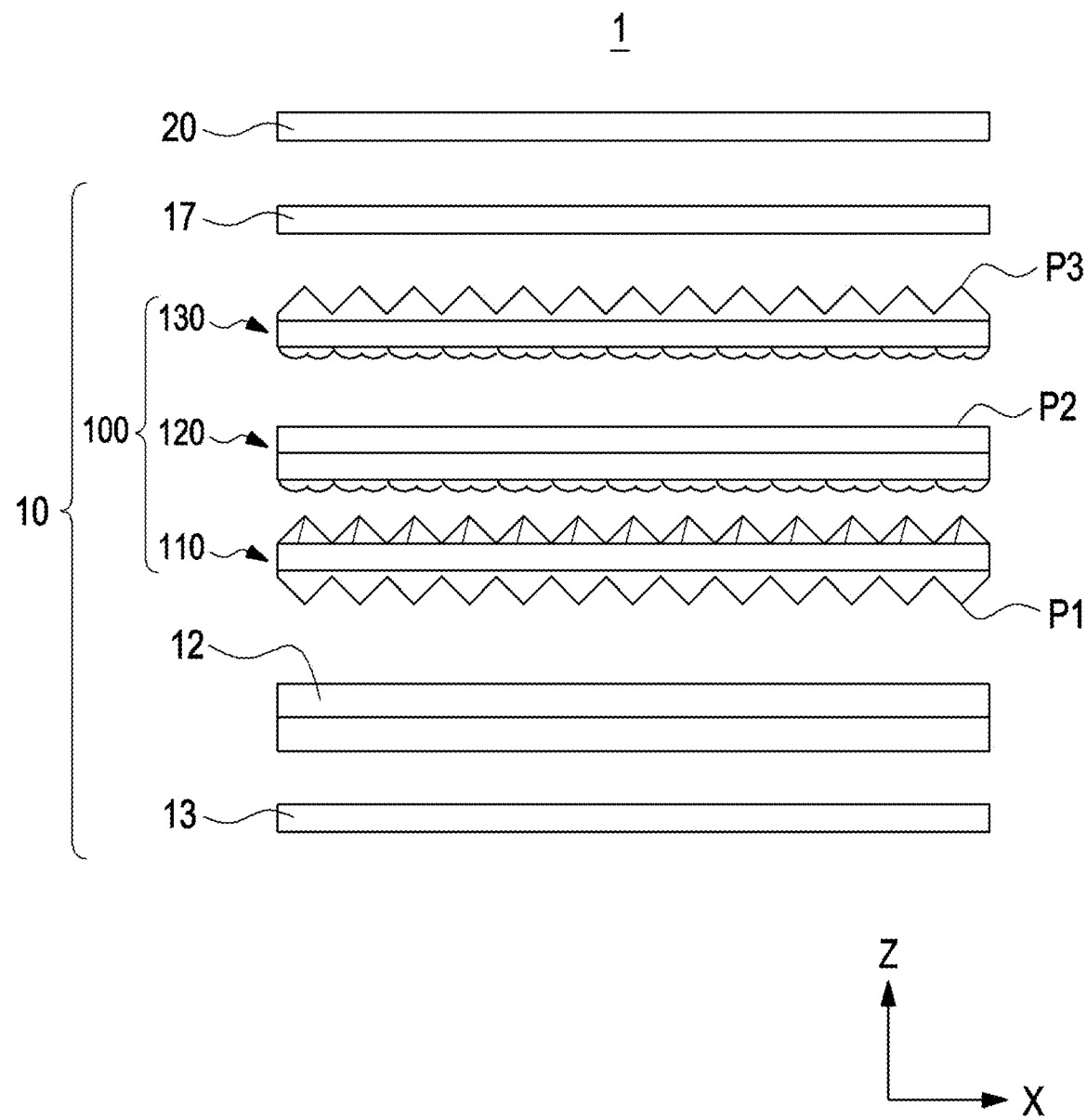
FIG. 3 is a drawing illustrating a liquid crystal display (LCD) device including an optical film according to an embodiment.

FIG. 2 is a drawing illustrating a liquid crystal display (LCD) device including an optical film according to an embodiment. FIG. 3 is a drawing illustrating a liquid crystal display (LCD) device including an optical film according to an embodiment.

FIG. 2 may represent a cross-section parallel to a plane formed by the Y and Z axes of the liquid crystal display (LCD) device 1 and FIG. 3 may represent a cross section parallel to a plane formed by the X and Z axes of the liquid crystal display (LCD) device 1. Below, overlapping description with FIG. 1 will be omitted.

The liquid crystal display (LCD) device 1 of the present disclosure may be characterized as replacing the diffusion sheet only with the optical film 100 of the present disclosure without a separate diffusion sheet (e.g., the lower diffusion sheet) between the optical film 100 and the light guide plate 12.

In the present disclosure, the 'optical film 100' may refer to a film including a first sheet 110 with a plurality of pyramid patterns formed on one surface, a second sheet 120 disposed on the first sheet 110 with a plurality of prism patterns formed on one surface, and a third sheet 130 disposed on the second sheet 120 with a plurality of prism patterns formed on one surface as shown in FIGS. 1 to 3. In FIGS. 1 to 3, for convenience of explanation, the first sheet 110, the second sheet 120, and the third sheet 130 are shown as spaced apart from each other. However, unlike this, the first sheet 110, the second sheet 120, and the third sheet 130 may be formed by being laminated with each other (via lamination). In the present specification, 'lamination' may mean that two different sheets are adhered by an included pattern formed of adhesive resin on at least one surface of the facing surface of the two different sheets. For example, there is a pattern formed of semi-cured adhesive resin on one of the two opposing surfaces of two different sheets and the other surface may be in contact with this pattern, and then completely cured and adhered. In addition, for example, two opposing surfaces of two different sheets may be formed of adhesive resin in a semi-cured state and may be fully cured and adhered after contacting each other. The laminated optical film 100 can be provided to a backlight unit that is thinner and has excellent shielding performance compared to an embodiment where the film is simply stacked rather than laminated.

The plurality of pyramid (or quadrangular pyramid) patterns of the first sheet 110 may refract and/or reflect light transmitted from the light source 11 and transmit it to the second sheet 120. The second sheet 120 may be formed with a plurality of prisms (or triangular pillars) extending in the lateral direction (X-axis direction) of the liquid crystal display (LCD) device 1 and protruding in the height direction (Z-axis direction). The second sheet 120 may transmit light passing through the first sheet 110 to the third sheet 130. The third sheet 130 may be formed with a plurality of prisms (or triangular pillars) extending in the longitudinal direction (Y-axis direction) of the liquid crystal display (LCD) device 1 and protruding in the height direction (Z-axis direction). The third sheet 130 can transmit light passing through the second sheet 120 toward the liquid crystal panel 20. Because the light incident to the optical film 100 from the light source 11 may be diffused and/or concentrated while sequentially passing through the first sheet 110, the second sheet 120, and the third sheet 130 to form the light source 11, it is possible to have the advantage of not only securing shielding performance for covering the shape of the light source 11, but also securing high brightness performance. According to an embodiment in FIGS. 1 to 3, the plurality of prism patterns of the second sheet 120 is shown to be extended in the lateral direction (X-axis direction) of the liquid crystal display (LCD) device 1 and the plurality of prism patterns of the third sheet 130 is shown to be extended in the longitudinal direction (Y-axis direction) of the liquid crystal display (LCD) device 1 but are not necessarily limited to. In contrast, the plurality of prism patterns of the second sheet 120 may be extended in the longitudinal direction (Y-axis direction) of the liquid crystal display (LCD) device 1 and the plurality of prism patterns of the third sheet 130 may be extend in the lateral direction (X-axis direction) of the liquid crystal display (LCD) device 1. However, it may be sufficient for the plurality of prism patterns of the second sheet 120 and the plurality of prism patterns of the third sheet 130 to be orthogonal to each other. Referring to FIG. 1 again, the pyramid pattern layer 111 of the first sheet 110 may include a pyramid pattern (referred to as the pyramid pattern 111a of FIG. 4A) having a length of a first side of a pyramid base of a in a first pyramid direction, a length of a second side of the pyramid base of b in a second pyramid direction, a height of h, and four side surfaces 111-1, 111-2, 111-3, 111-4 having vertex angles of A and B. The dimensions of the pyramid pattern may be set differently depending on the embodiment.

Below, the optical film 100 will be described in more detail with reference to FIGS. 4A to 4F.

Figure 4A:
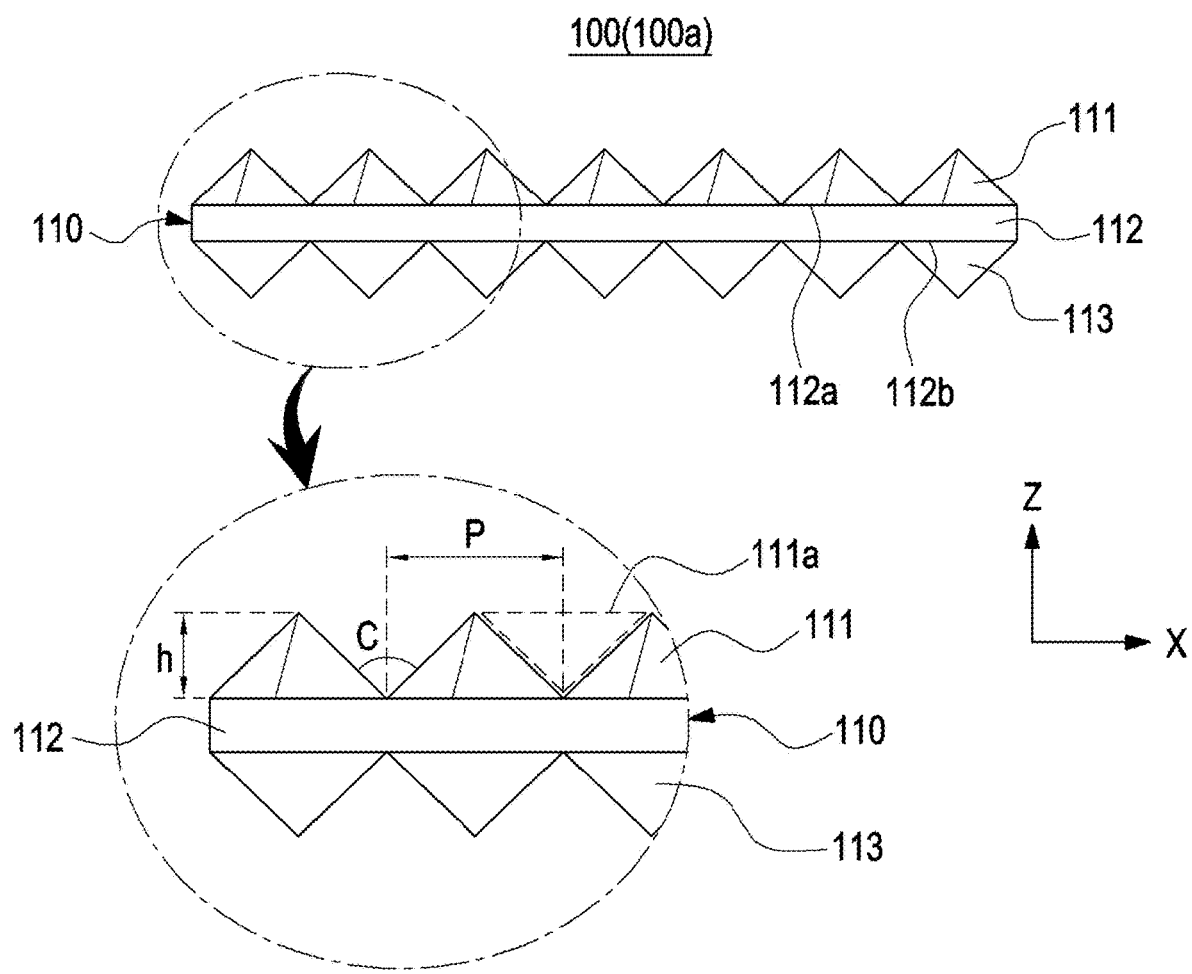
FIG. 4A is a cross-sectional view showing an optical film according to an embodiment.
Figure 4B:
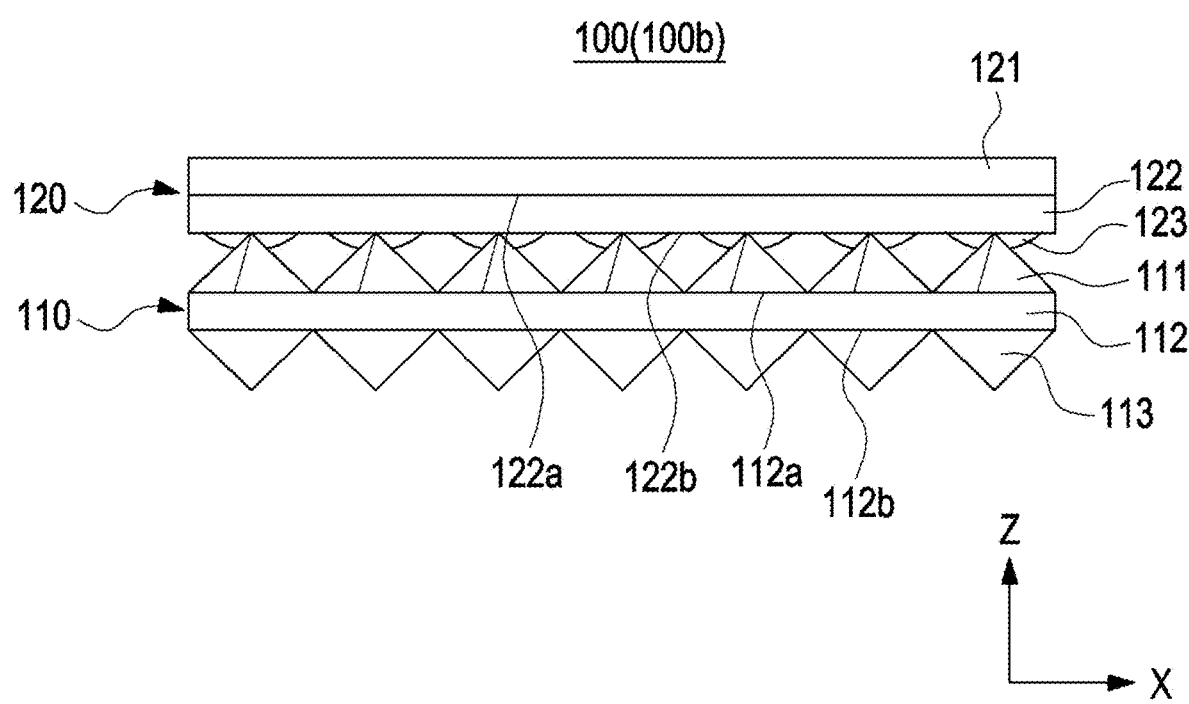
FIG. 4B is a cross-sectional view showing an optical film according to an embodiment.
Figure 4C:
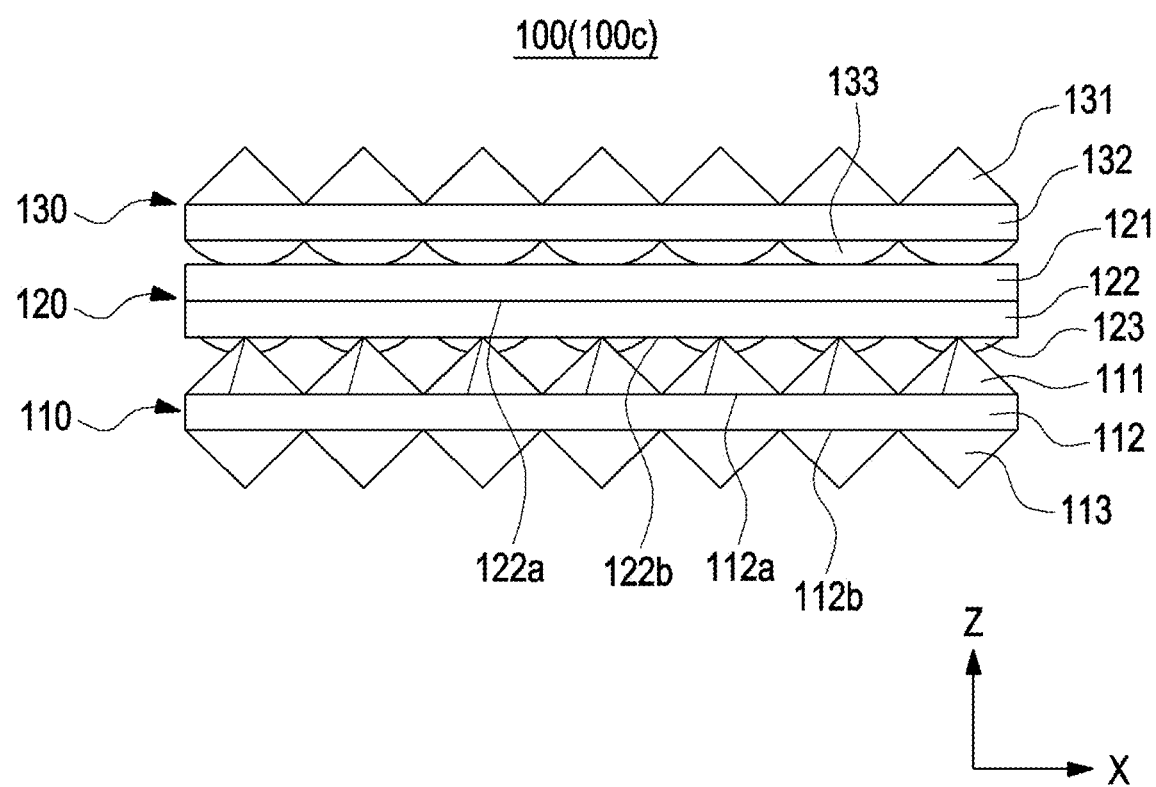
FIG. 4C is a cross-sectional view showing an optical film according to an embodiment.
Figure 4D:
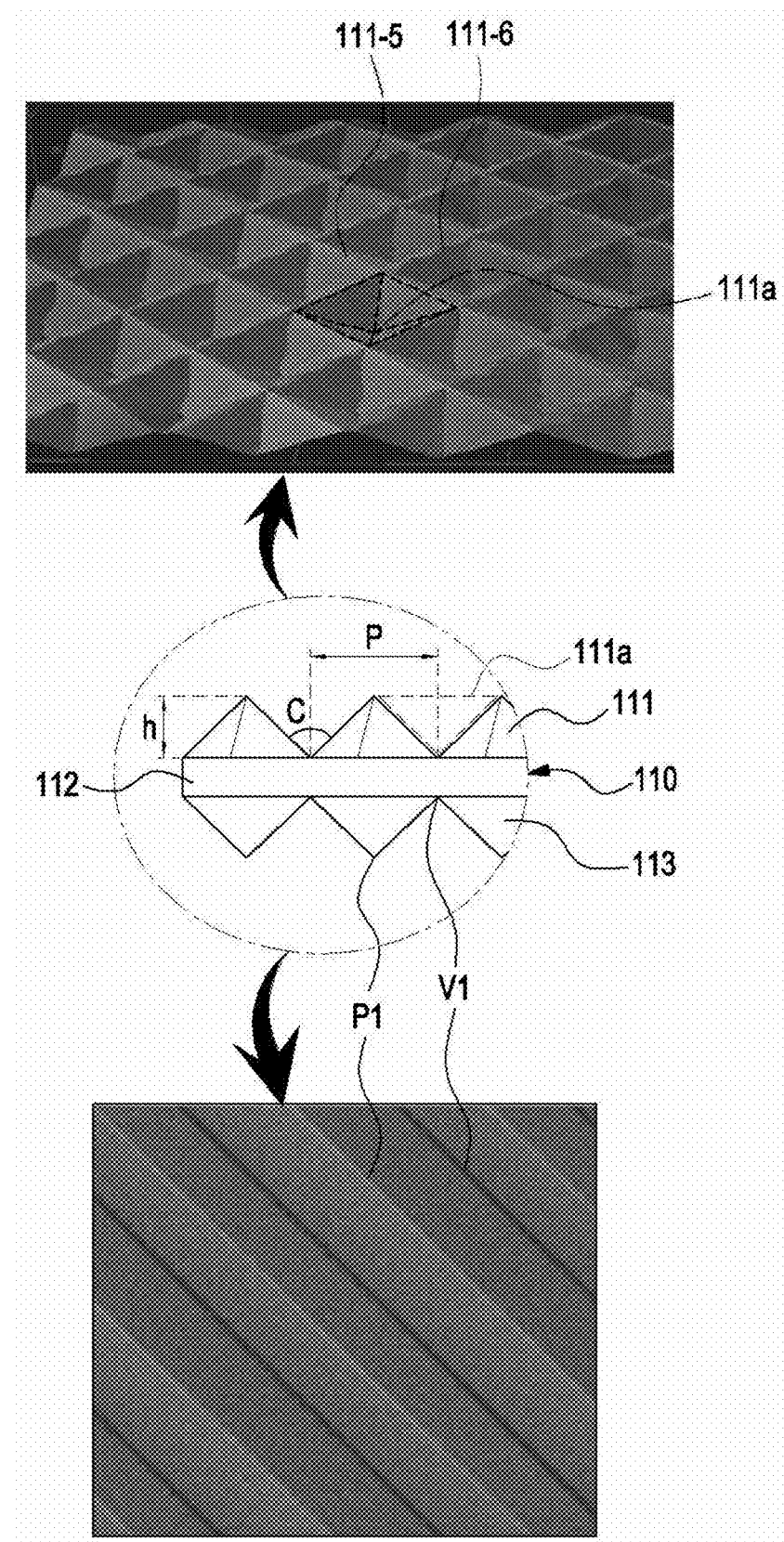
FIG. 4D is an image and a cross-sectional view showing a pyramid pattern and a prism pattern according to an embodiment.
Figure 4E:
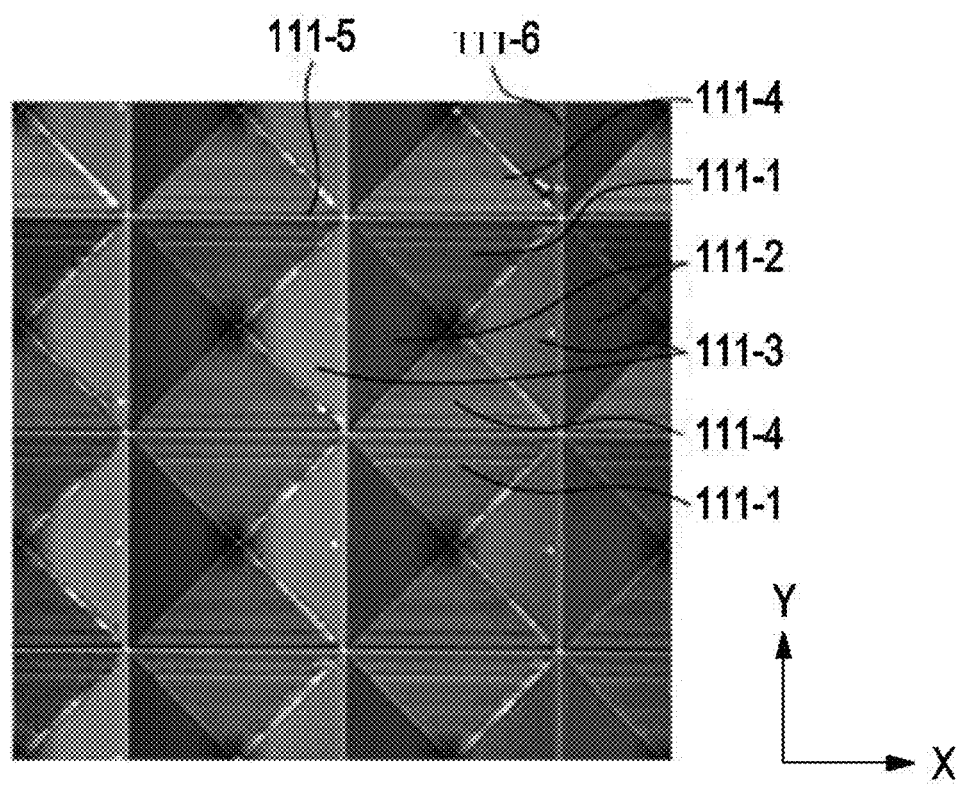
FIG. 4E is an image illustrating a top view of the pyramid pattern layer before lamination according to an embodiment.
Figure 4F:
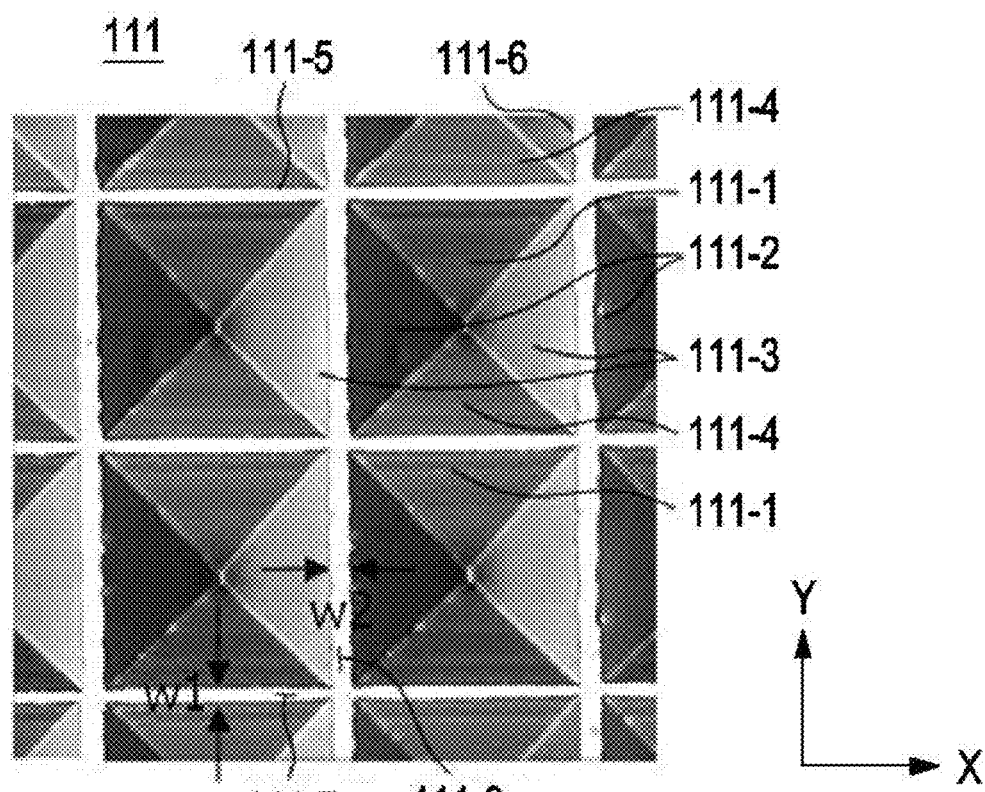
FIG. 4F is an image illustrating a top view of the pyramid pattern layer after lamination according to an embodiment.

FIG. 4A is a cross-sectional view showing an optical film according to an embodiment. FIG. 4B is a cross-sectional view showing an optical film according to an embodiment. FIG. 4C is a cross-sectional view showing an optical film according to an embodiment. FIG. 4D is an image and a cross-sectional view showing a pyramid pattern and a prism pattern according to an embodiment. FIG. 4E is an image illustrating a top view of the pyramid pattern layer before lamination according to an embodiment. FIG. 4F is an image illustrating a top view of the pyramid pattern layer after lamination according to an embodiment.

Referring to FIGS. 4A to 4C, the optical film 100 according to an embodiment of the present disclosure may include an optical film 100a including a first sheet 110, an optical film 100b including the first sheet 110, and a second sheet 120, and an optical film 100c including the first sheet 110, the second sheet 120 and a third sheet 130. For example, the first sheet 110 may be used alone as a component of the optical film 100a without using other sheets (e.g., the second sheet 120 and the third sheet 130). According to the present disclosure, the second sheet 120 and/or the third sheet 130 may further include the first sheet 110 thereby providing an optical film with excellent shielding performance against a light source and excellent brightness performance. Below, unless otherwise specified, each component included in the optical film 100 may be described in detail using the optical film 100c of FIG. 4C as an example for convenience. According to an embodiment, the optical film of three sheets 110, 120, 130 (e.g., the optical film 100c of FIG. 4C) as well as the optical film of one sheet 110 (e.g., the optical film 100a of FIG. 4A) and the optical film of two sheets 110, 120 (e.g., the optical film 100b of FIG. 4B) may also be included within the scope of the present disclosure.

Referring to FIG. 4C, the optical film 100 (e.g., optical film 100c) may include the first sheet 110, the second sheet 120, and the third sheet 130, respectively, and they may also respectively include a first base portion 112, a second base portion 122, and a third base portion 132. At this time, the first base portion 112, the second base portion 122, and the third base portion 132 may be made of transparent material capable of transmitting light including, for example, polycarbonate series, polysulfone series, polyacrylate series, polystyrene series, polyvinyl chloride series, polyvinyl alcohol series, polynorbornene series, and polyester series material. For a specific example, the first base portion 112, the second base portion 122, and/or the third base portion 132 may be made of polyethylene terephthalate (PET) or polyethylene naphthalate, etc. The first base portion 112, the second base portion 122, and the third base portion 132 may be, for example, PET with a thickness of about 10 μm to about 50 μm, and more specifically, they may be PET having a thickness of about 24 μm to about 40 μm. In various experimental examples including the viewing angle distribution described later in the drawings in FIG. 6A, the first base portion 112, the second base portion 122, and the third base portion 132 each made of PET with a thickness of 24 μm can be used as examples. However, it should be noted that the thicknesses of the first base portion 112, the second base portion 122, and the third base portion 132 are not limited to the above examples.

As previously discussed in the embodiment of FIG. 1, the first sheet 110 may include a pyramid pattern 111*a* with a first pyramid directional length of a, a second pyramid directional length of b, a height of h, a pitch of P, and four side surfaces 111-1, 111-2, 111-3, 111-4 forming the vertex angles of A and B corresponding to a quadrangular pyramid shape formed on the first surface 112*a* of the first base portion 112. The optical film 100 may include a plurality of pyramid patterns 111*a* having a plurality of columns in the first pyramid direction and a plurality of rows in the second pyramid direction perpendicular to the first pyramid direction.

Referring to FIGS. 4A and 4D together, according to an embodiment, the pyramid pattern 111*a* may be an intaglio pattern. The pyramid pattern 111*a* may mean an intaglio pattern where quadrangular pyramid shaped grooves are formed regularly and it may be defined by the four side surfaces 111-1, 111-2, 111-3, 111-4. Here, the four sides may have the same or different triangular shapes, and the dimensions of the vertex angles of A and B may be set according to the lateral length of a, the longitudinal length of b, and the height of each cross-section of the pyramid pattern 111*a*. According to an embodiment, the vertex angles A and B may be formed as substantially the same angle, and accordingly, the lateral length of a and the longitudinal length of b of the pyramid pattern 111*a* may also be set to be substantially the same. Here, the fact that the vertex angles A and B are substantially the same may mean that the vertex angle A and the vertex angle B have the same value within a process deviation (e.g., about 10%).

Additionally, the height of h and the pitch of P may be set with respect to the vertex angle of C of the pyramid pattern 111*a*. The optical film 100 may include the pyramid pattern 111*a* whose vertical cross-section parallel to the height direction (Z-axis direction) is triangular or trapezoid and the vertex angle of C may be defined as an angle formed between two opposing sides of the four sides of the pyramid pattern 111*a*.

According to an embodiment, the vertex angle of C of the pyramid pattern 111*a* may be defined as 60° or more and 160° or less. For example, the vertex angle of C may be 90°. As the vertex angle of C of the pyramid pattern 111*a* is increased within a specified angle range, the angle θ (theta) of light incident to the second sheet 120 (referred to as 'incident angle θ') may be increased. For example, for an optical film (e.g., the optical film 100*c*) including three sheets of the present specification, the first sheet 110 including the pyramid pattern 111*a* may play a role in ensuring that light incident to the second sheet 120 and the third sheet 130 can be incident at an optimal angle in a way to improve brightness. The relationship between the components of the optical film and the brightness will be described in more detail later through examples in FIG. 5.

According to an embodiment, the pyramid pattern 111*a* may also be formed as an embossed pattern.

FIG. 4E shows the pyramid pattern layer before the first sheet 110 is laminated to the second sheet 120 and FIG. 4F shows the pyramid pattern where the first sheet 110 is peeled from the second sheet 120 after the first sheet 110 and the second sheet 120 was laminated. Referring to FIG. 4E, the pyramid pattern layer 111 before lamination may include a first barrier rib 111-5 formed between the first side surface 111-1 and the fourth side surface 111-4 for defining a boundary between the first side surface 111-1 and the fourth side surface 111-4 and a second barrier rib 111-6 formed between the second side surface 111-2 and the third side surface 111-3 for defining a boundary between the second side surface 111-2 and the third side surface 111-3. The barrier rib 111-5 and the second barrier rib 111-6 may be the uppermost part of the first sheet 110. According to an embodiment, the first barrier rib 111-5 may be formed to be parallel to the first pyramid direction and the second barrier rib 111-6 may be formed to be parallel to the second pyramid direction, but noted that it is not necessarily limited. Referring to FIG. 4F, if the pyramid pattern layer 111 disposed on the upper surface of the first sheet 110 is laminated to the rear surface of the second sheet 120 (e.g., the rear surface of the second base portion 121 of the second sheet 120 or the first diffusion layer 123 of the second sheet 120), tips of the first barrier rib 111-5 and the second barrier rib 111-6, which are the uppermost part of the pyramid pattern layer 111, may be pressed. Accordingly, the tip of the first barrier rib 111-5 may be deformed to form a first flat portion 111-7 with a predetermined width W1 and the tip of the second barrier rib 111-6 may be deformed to form a second flat portion 111-8 with predetermined width W2. According to an embodiment, the width W1 of the first flat portion 111-7 and the width W2 of the second flat portion 111-8 may be substantially the same.

According to various embodiments of the present disclosure, it is possible to control light in four quadrant directions in the peripheral area by including the pyramid pattern layer 111. According to an embodiment of the present disclosure, the pyramid pattern layer 111 may include a pyramid pattern 111*a* whose vertex angle, which is the angle between two opposing triangles, may be greater than or equal to 90° and less than or equal to 130°. According to an embodiment, if the vertex angle of the pyramid pattern 111*a* is formed at an angle of at least 90°, the shielding performance can be satisfied and if the vertex angle is less than 90°, hot spot visibility (HSV) where the light source 11*a* is visible may be increased.

The pyramid pattern layer 111 may be composed of a plurality of pyramid patterns and may be regularly arranged on the first surface 112*a* of the first sheet 110. A first prism pattern layer 113 including a plurality of first prism patterns may be formed on the second surface 112*b* of the first base portion 112. Except for the direction where the first prism pattern layer 113 is arranged with the second prism pattern layer 121 provided on the second sheet 120 and the third prism pattern layer 131 provided on the third sheet 130, it may have substantially the same configuration with others.

The second sheet 120 may be formed on the first surface 122*a* of the second base portion 122 with a plurality of second prism patterns extended in parallel in the lateral direction (or longitudinal direction) of the liquid crystal display (LCD) device 1. It may include a second prism pattern layer 121. The cross-section of the second prism pattern layer 121 may be triangular. For example, the plurality of second prism patterns included in the second prism pattern layer 121 may have a pitch of "c" and a height of "d." The third sheet 130 may be formed on the first surface 132a of the third base portion 132 with a plurality of third prism patterns extended in parallel in the longitudinal direction (or lateral direction) of the liquid crystal display (LCD) device 1. It may include a third prism pattern layer 131. The cross-section of the prism pattern formed in the third prism pattern layer 131 may be triangular. For example, the plurality of third prism patterns formed in the third prism pattern layer 131 may have a pitch of "e" and a height of "f." Here, the plurality of second prism patterns included in the second prism pattern layer 121 and the plurality of third prism patterns included in the third prism pattern layer 131 may be extended in directions orthogonal to each other and the second and the third prism patterns may be formed to have the same pitch and height each other, but is not necessarily limited to and the configuration of the prism patterns may be varied depending on the embodiment.

A first diffusion layer 123 may be included on the second surface 122b of the second base portion 122 of the second sheet 120 and a second diffusion layer 133 may be included on the second surface 132b of the third base portion 132 of the third sheet 130. The first diffusion layer 123 and the second diffusion layer 133 may be treated to have a matte pattern to increase turbidity by creating a rough surface of the first diffusion layer 123 and the second diffusion layer 133, respectively, by using beads of glass and polymer, etc. It can be manufactured using any treatment method that increases turbidity including bead treatment to increase turbidity. For example, in various experimental examples including the viewing angle distribution described later in the drawings of FIG. 8A, the first diffusion layer 123 has a haze value of 3% and the second diffusion layer 133 has a haze value of 40%.

The first sheet 110 and the second sheet 120 may be laminated through the pyramid pattern layer 111 of the first sheet 110 and the second sheet 120 (or the first diffusion layer 123 of the second sheet 120). The second sheet 120 and the third sheet 130 may be laminated through the second prism pattern layer 121 of the second sheet 120 and the third sheet 130 (or the second diffusion layer 133 of the third sheet 130). At this time, each of the first diffusion layer 123 and the second diffusion layer 133 may be formed of, for example, an adhesive (e.g., adhesive resin) matte pattern. It can be manufactured by initially laminating a sheet with approximately 50% cured state which was not 100% cured (e.g., a semi-cured state) to another sheet and then, laminating the sheet to another sheet with being 100% cured state.

Figure 5A:
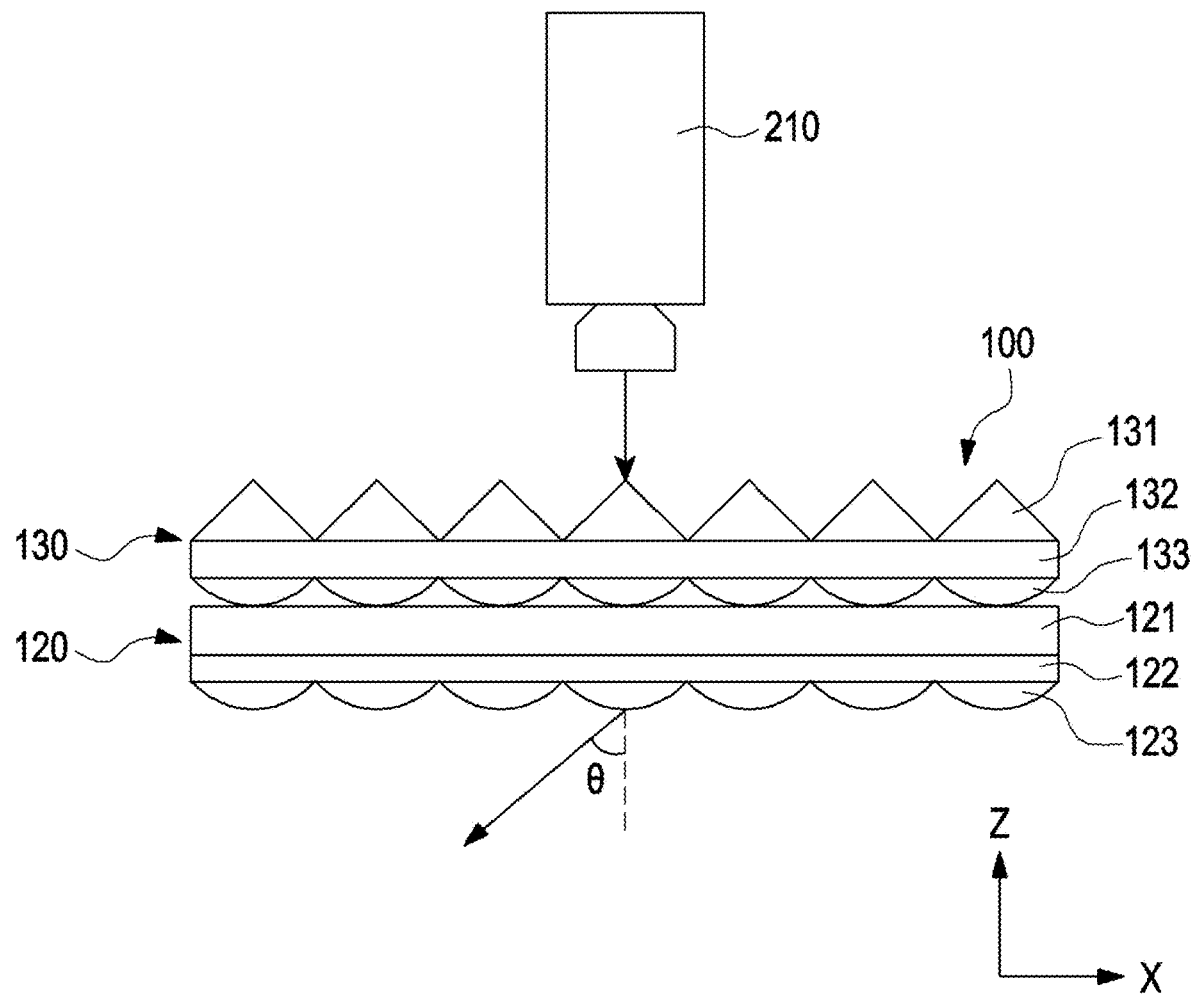
FIG. 5A shows the configuration for measuring the brightness of an optical film according to an embodiment.

FIG. 5A shows the configuration for measuring the brightness of an optical film according to an embodiment. FIG. 5B is a table showing a viewing angle distribution and an optimal incident angle for increasing light distribution and brightness according to an embodiment. In FIG. 5B, the viewing angle distribution may represent the distribution of light focused on a horizontal plane (e.g., a plane parallel to the X-Y plane).

Referring to FIG. 5A, the configuration of an experiment for measuring the brightness may include an optical film 100 and an optical measurement device 210. Here, the optical film 100 may represent the second sheet 120 and the third sheet 130 laminated together and the first sheet 110 may be omitted. The optical measurement device 210 may be a high-speed spectroscopic measurement system such as a colorimetric luminance meter. Although not shown in the drawing, a backlight unit including a light source may be disposed on the opposite side of the optical measurement device 210 with respect to the optical film 100.

The optical measurement device 210 can measure light incident to the height direction (Z-axis direction) of the optical film 100 as shown in FIG. 5A. As shown in FIG. 5B, the light distribution can be shown using a viewing angle distribution (e.g., BSDF, bidirectional scattering distribution function). At this time, to obtain high brightness for the liquid crystal display LCD) device 1, the brightness near '0° reference of the optical measurement device' which is parallel to the Z-axis direction where the optical measurement device 210 faces must be high in the viewing angle data measured by the optical measurement device 210. It was found through experimental results that the brightness around 0° became the highest when light passing through the second sheet 120 and the third sheet 130 in the optical film 100 was incident at a specific angle. In other words, the brightness of the liquid crystal display (LCD) device 1 can be the highest when light passing through the lower surface of the laminated one of the second sheet 120 and the third sheet 130 (e.g., the second surface 122b of the second sheet 120) is incident at a specific incident angle (θ). Here, the incident angle θ may mean an angle formed by central light of the light (or light bundle) emitted from the first sheet 110 with respect to a normal line to the second surface 122b of the second sheet 120.

For example, referring to an embodiment (example 1-1) of FIG. 5B, in an embodiment where the second base portion 122 and the third base portion 132 have a thickness of 24 μm, respectively, if the pitch "c" of the prism pattern of the second prism pattern layer 121 formed on the first surface 122a of the second base portion 122 is 50 μm and the height "d" is 25 μm; the first diffusion layer 123 formed on the second surface 122b of the second base portion 122 has a haze value of 3%; the pitch "e" of the prism pattern of the third prism pattern layer 131 formed on the first surface 132a of the third base portion 132 is 50 μm and the height "f" is 25 μm; and the second diffusion layer 133 formed on the second surface 132b of the third base portion 132 has a haze value of 40%, the optimal incident angle (θ) where the brightness near 0° reference of the optical measurement device becomes the highest may be formed at 65°. In other words, when light passing through the lower surface of the laminated one of the second sheet 120 and the third sheet 130 (e.g., the second surface 122b of the second sheet 120) is incident at +65° (or) −65°, the highest brightness can be achieved.

In addition, for example, referring to an embodiment (example 1-2) of FIG. 5B, in an embodiment where the second base portion 122 and the third base portion 132 have a thickness of 24 μm, respectively, if the pitch "c" of the prism pattern of the second prism pattern layer 121 formed on the first surface 122a of the second base portion 122 is 45 μm and 55 μm and the height "d" is 22.5 μm and 22.7 μm; the first diffusion layer 123 formed on the second surface 122b of the second base portion 122 has a haze value of 15%; the pitch "e" of the prism pattern of the third prism pattern layer 131 formed on the first surface 132a of the third base portion 132 is 50 μm and the height "f" is 25 μm; and the second diffusion layer 133 formed on the second surface 132b of the third base portion 132 has a haze value of 30%, the optimal angle of incidence (θ) where the brightness near 0° reference of the optical measurement device becomes the highest may be formed at 73°. In other words, when light passing through the lower surface of the laminated one of the second sheet 120 and the third sheet 130 (e.g., the second surface 122b of the second sheet 120) is incident at +73° (or −73°), the highest brightness can be achieved.

To summarize the above, the incident angle (θ) of light incident to the second sheet 120 may be determined by the configuration and/or the ridge direction (e.g., P2 in FIG. 1) of the plurality of second prism patterns of the second prism pattern layer 121 included in the second sheet 120 and the configuration and/or the ridge direction (e.g., P3 in FIG. 1) of the plurality of third prism patterns of the third prism pattern layer 131 included in the third sheet 130. In other words, the incident angle (θ) can be set in various ways depending on the requirements of the second sheet 120 and/or the third sheet 130 required also for the optical film 100. Because the optical film 100 in the present disclosure may include the first prism pattern layer 113 including the prism pattern on the lower surface and the pyramid pattern layer 111 including the pyramid pattern on the upper surface based on the first base portion 112, it is possible to form an optical path corresponding to the optimal incident angle (θ) required for the optical film 100 according to a certain embodiment and as a result, the optical film 100 with high brightness can be provided. Meanwhile, referring to FIG. 5B, the viewing angle (Φ) is displayed, and it may mean an angle formed by an imaginary line drawn from the center of the viewing angle distribution shown in FIG. 5B to one side (e.g., a direction parallel to the X-axis) and the central light of the emitted light (or light bundle) from the first sheet 110. The viewing angle (Φ, phi) is determined by the configuration and/or the ridge direction (e.g., P1 in FIG. 1) of the plurality of first prism patterns of the first prism pattern layer 113 of the first sheet 110 where light is incident to the second sheet 120. The optimal viewing angle (Φ) in the two embodiments (example 1-1, example 1-2) shown in FIG. 5B is formed at 45°. Below, it will be explained as to the viewing angle (Φ) in details through embodiments in FIGS. 6A and 6B.

According to various embodiments of the present disclosure, the optical film 100 including the first sheet 110 designed to increase the shielding performance in the direction where light is incident as well as for light passing through the lower surface of the laminated one of the second sheet 120 and the third sheet 130 (e.g., the second surface 122b of the second sheet 120) to be incident at a specific angle θ simultaneously.

Referring to FIGS. 1 to 5B, the optical film 100 according to one embodiment may comprise the first sheet 110 including the first base portion 112, the pyramid pattern layer 111 where a plurality of pyramid patterns is formed on the first surface 112a of the first base portion 112, and a first prism pattern layer 113 where a plurality of first prism patterns is formed on the second surface 112b of the first base portion 112; the second sheet 120 disposed overlapping the first sheet 110 including the second base portion 122, the second prism pattern layer 121 where a plurality of second prism patterns are formed on the first surface 122a of the second base portion 122, and the first diffusion layer 123 formed on the second surface 122b of the second base portion 122; and the third sheet 130 disposed overlapping the second sheet 120 including the third base portion 132, the third prism pattern layer 131 where a plurality of third prism patterns formed on the first surface 132a of the third base portion 132, and the second diffusion layer 133 formed on the second surface 132b of the third base portion 132.

In the liquid crystal display (LCD) device 1 of FIGS. 1 to 5B, the first sheet 110, the second sheet 120, and the third sheet 130 may be manufactured in a form where the first sheet 110, the second sheet 120, and the third sheet 130 are laminated together. Particularly considering the configurations of the laminated second sheet 120 and the third sheet 130, the first sheet 110 can refract and/or reflect light to enter at an angle θ from a point where the second surface 122b of the second sheet 120 meets to the second sheet 120 by properly adjusting the configurations of the pyramid pattern layer 111 formed on the first surface 112a of the first base portion 112 and the first prism pattern layer 113 formed on the second surface 112b of the first base portion 112 (improvement of brightness performance).

Figure 6A:
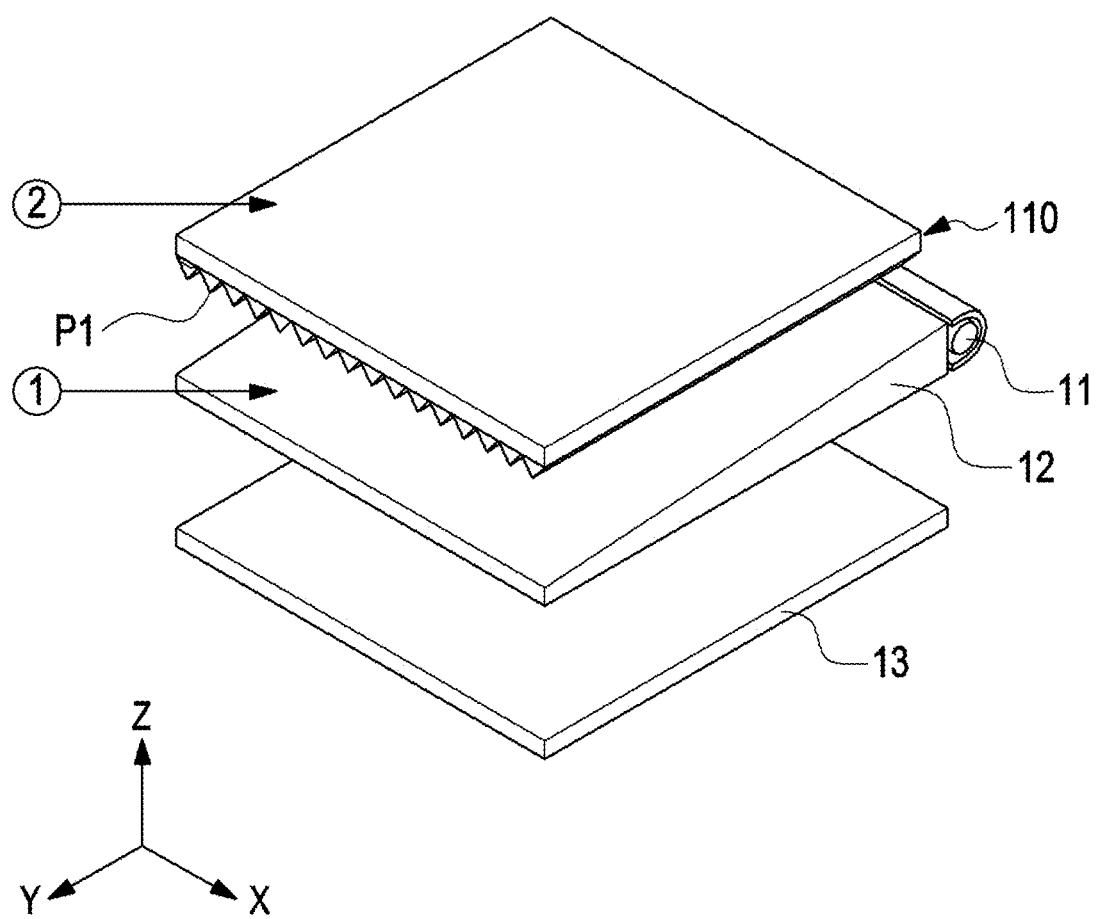
FIG. 6A is a drawing of a backlight unit including a sheet formed with a reversed prism pattern (a first prism pattern layer) and an edge type light source according to a certain embodiment.

FIG. 6A is a drawing of a backlight unit including a sheet formed with a reversed prism pattern (a first prism pattern layer) and an edge type light source according to a certain embodiment. FIG. 6B is a table showing changes in Incident Angle and Viewing Angle with respect to changes in the refractive index of the reversed prism pattern layer. Through the embodiments of FIGS. 6A and 6B, it can be seen how the viewing angle (Φ) shown in FIG. 5B is set according to the change in the refractive index of the reversed prism pattern layer.

According to a certain embodiment, as shown in FIG. 6A, a first sheet 110' may be provided with a first prism pattern layer including a plurality of first prism patterns formed on the second surface without having the pyramid pattern layer including a plurality of pyramid patterns on the first surface. In FIG. 6B, the emitted light was measured between the light guide plate 12 and the first sheet 110' in the implementation shown in FIG. 6A and may represent data as to the optical characteristics of the light emitted from the light guide plate 12. The various embodiments (Example 2-1, Example 2-2, and Example 2-3) of FIG. 6B may represent data as to the optical characteristics of light measured on the first sheet 110'.

Referring to FIGS. 6A and 6B, the arrangement direction (e.g., P1) of the ridges of the plurality of first prism patterns may be perpendicular to the arrangement of the light source (e.g., arranged in the fourth direction parallel to the X-axis). According to a certain embodiment, as the refractive index of the prism pattern layer provided on the first sheet 110' changes, the incident angle θ to the second surface 122b of the second sheet 120 is maintained at approximately 73° and it can be confirmed that the viewing angle (Φ) changes as the refractive index of the first prism pattern layer changes. For example, when the refractive index of the first prism pattern layer is 1.49, the incident angle to the second surface 122b of the second sheet 120 can be formed at approximately +74° (or) −74° and the viewing angle can be formed at approximately 60°. For another example, when the refractive index of the first prism pattern layer is 1.58, the incident angle to the second surface 122b of the second sheet 120 can be formed at approximately +72° (or) −72° and the viewing angle can be formed at approximately 54°. For another example, when the refractive index of the first prism pattern layer is 1.69, the incident angle to the second surface 122b of the second sheet 120 can be formed at approximately +73° (or) −73° and the viewing angle can be formed at approximately 53°. In other words, the viewing angle Φ of light incident to the second surface 122b of the second sheet 120 can be adjusted to a desired angle by adjusting the refractive index of the first prism pattern layer. Using this principle, the specifications of the pyramid pattern layer 111 and the first prism pattern layer 113 provided on the first sheet can be set in various ways so that the optical film 100 can demonstrate optimal brightness performance.

Figure 7:
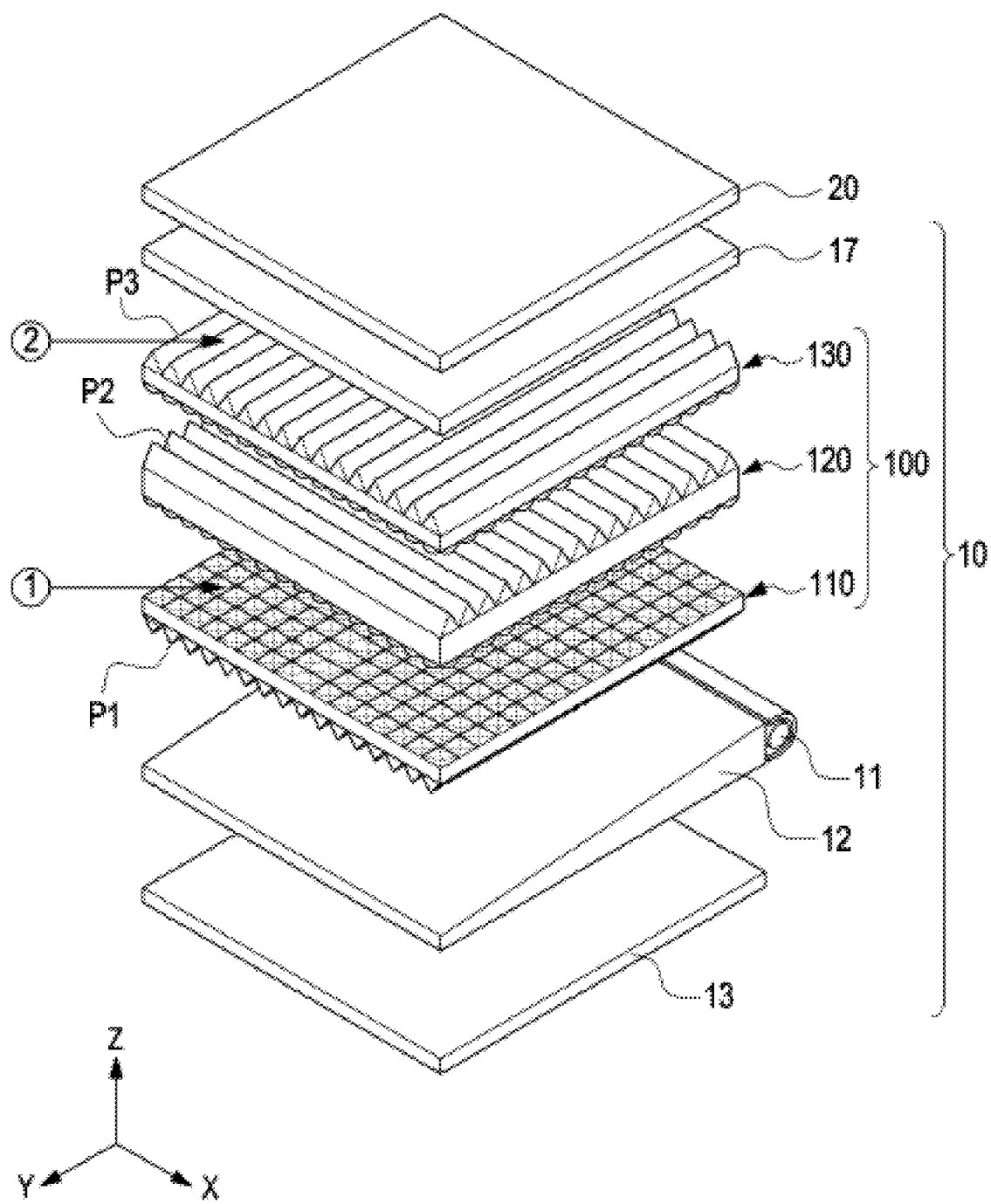
FIG. 7 is a perspective view showing a liquid crystal display (LCD) device including an optical film according to an embodiment.
Figure 8A:
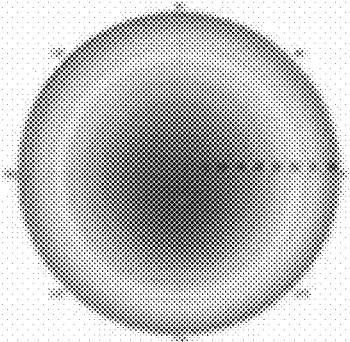
FIG. 8A is a table showing optical characteristics of a liquid crystal display (LCD) device including a diffusion plate according to a certain embodiment.
Figure 8A:
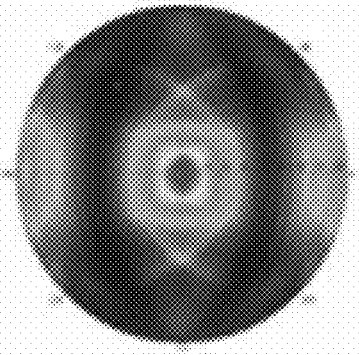
Figure 8B:
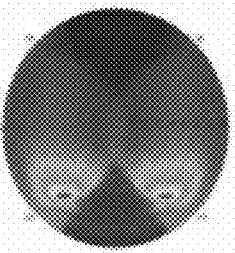
FIG. 8B is a table showing optical characteristics of a liquid crystal display (LCD) device including an optical film according to an embodiment.
Figure 8B:
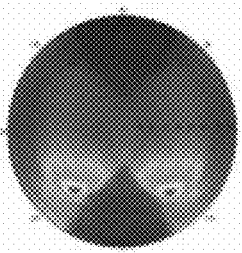
Figure 8B:
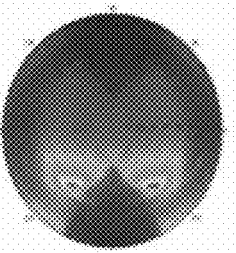
Figure 8B:
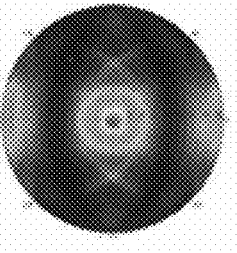
Figure 8B:
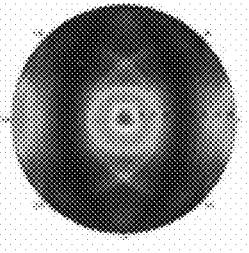
Figure 8B:
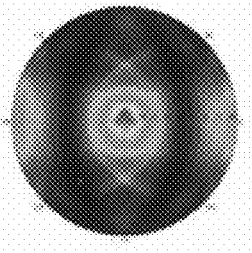
Figure 8C:
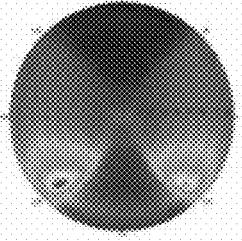
FIG. 8C is a table showing optical characteristics of a liquid crystal display (LCD) device including an optical film according to an embodiment.
Figure 8C:
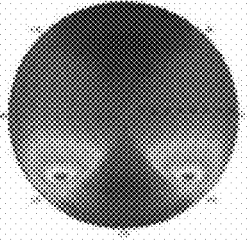
Figure 8C:
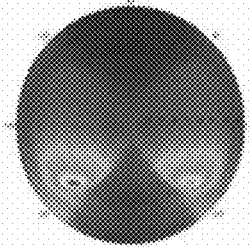
Figure 8C:
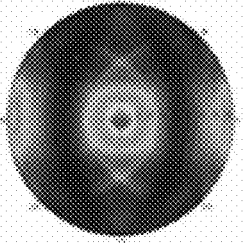
Figure 8C:
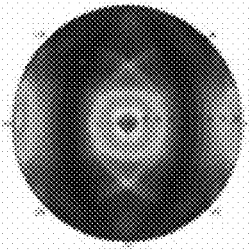
Figure 8C:
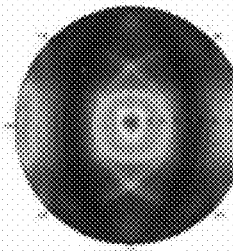

FIG. 7 is a perspective view showing a liquid crystal display (LCD) device including an optical film according to an embodiment. FIG. 8A is a table showing optical characteristics of a liquid crystal display (LCD) device including a diffusion plate according to a certain embodiment. FIG. 8B is a table showing optical characteristics of a liquid crystal display (LCD) device including an optical film according to an embodiment. FIG. 8C is a table showing optical characteristics of a liquid crystal display (LCD) device including an optical film according to an embodiment.

According to a certain embodiment, as shown in FIG. 6A, the first sheet 110 may be provided with the pyramid pattern layer including a plurality of pyramid patterns on the first surface and the first prism pattern layer including a plurality of first prism patterns on the second surface. For the remaining components excluding the first sheet 110, the above-described descriptions with reference to FIGS. 1 to 5B may be referred to. In FIG. 8A, the 'diffusion plate' may represent the optical characteristics and their related data (e.g., Viewing Angle Distribution 1, Viewing Angle Distribution 2, Brightness, Incident Angle (θ), and Viewing Angle (Φ)) of light measured between an optical sheet added with light diffuser beads instead of the first sheet 110 and the second sheet 120 and measured between the diffusion sheet 17 and the third sheet 130 in the liquid crystal display (LCD) device 1 of FIG. 7. In addition, various embodiments ('Example 3-1', 'Example 3-2', and 'Example 3-3') of FIG. 8B may represent the optical characteristics and their related data (e.g., Viewing Angle Distribution 1, Viewing Angle Distribution 2, Brightness, Incident Angle (θ), and Viewing Angle (Φ)) of light measured between the first sheet 110 and the second sheet 120 and measured between the third sheet 130 and the diffusion sheet 17 when the refractive index (Diff PY) of the pyramid pattern layer 111 and the refractive index (Diff P) of the first prism pattern layer 113 of the first sheet 110 are widely varied. In addition, various embodiments ('Example 3-4', 'Example 3-5', and 'Example 3-6') of FIG. 8C may represent the optical characteristics and their related data (e.g., Viewing Angle Distribution 1, Viewing Angle Distribution 2, Brightness, Incident Angle (θ), and Viewing Angle (Φ)) of light measured between the first sheet 110 and the second sheet 120 and measured between the third sheet 130 and the diffusion sheet 17 when the refractive index (Diff PY) of the pyramid pattern layer 111 and the refractive index (Diff P) of the first prism pattern layer 113 of the first sheet 110 are widely varied. Viewing Angle Distribution 1 is intended to represent the viewing angle for light emitted from the first sheet 110 and it may represent the distribution of light formed on a horizontal plane at a point between the first sheet 110 and the second sheet 120 (e.g., a plane parallel to the X-Y plane). Viewing Angle Distribution 2 is intended to represent the viewing angle for light emitted from the entire optical film 100 and it may represent the distribution of light formed on a horizontal plane at a point between the third sheet 130 and the diffusion sheet 17 (e.g., a plane parallel to the X-Y plane). Reviewing FIGS. 8A, 8B, and 8C, when the refractive index (Diff PY) of the pyramid pattern layer 111 of the first sheet 110 and the refractive index (Diff P) of the first prism pattern layer 113 were widely varied, it can be confirmed that Brightness, Incident Angle (θ), and/or Viewing Angle (Φ) were also widely varied.

Reviewing the various embodiment ('Example 3-1', 'Example 3-2', and 'Example 3-3') of FIG. 8B, when the refractive index (Diff PY) of the pyramid pattern layer 111 and the refractive index (Diff P) of the first prism pattern layer 113 of the first sheet 110 are 1.58 and 1.49, respectively as shown in Example 3-2, it has a brightness value of 125.2% compared to the embodiment equipped with the diffusion sheet of FIG. 8A and thus, it can be confirmed that the brightness performance is improved. In addition, it can be seen that it has the highest brightness increase effect as being set as shown in Example 3-2 compared to when the refractive index (Diff PY) of the pyramid pattern layer 111 of the first sheet 110 and the refractive index (Diff P) of the first prism pattern layer 113 are set as shown in Example 3-1 or Example 3-3.

Reviewing the various embodiment ('Example 3-4', 'Example 3-5', and 'Example 3-6') of FIG. 8C, when the refractive index (Diff PY) of the pyramid pattern layer 111 and the refractive index (Diff P) of the first prism pattern layer 113 of the first sheet 110 are 1.58 and 1.69, respectively as shown in Example 3-5, it has a brightness value of 120.6% compared to the embodiment equipped with the diffusion sheet of FIG. 8A and thus, it can be confirmed that the brightness performance is improved. In addition, it can be confirmed that it has the highest brightness increase effect as being set as shown in Example 3-5 compared to when the refractive index (Diff PY) of the pyramid pattern layer 111 of the first sheet 110 and the refractive index (Diff P) of the first prism pattern layer 113 are set as shown in Example 3-4 or Example 3-6.

According to various embodiments, the difference in refractive index (|Diff P−Diff PY|) between the pyramid pattern layer 111 and the first prism pattern layer 113 of the first sheet 110 can be formed to be 0.2 or less at most. Referring to FIGS. 8B and 8C, when the absolute value of the difference between the refractive indices of the pyramid pattern layer 111 and the first prism pattern layer 113 is 0.2 or less, the brightness of the light emitted from the first sheet 110 can be improved.

According to various embodiments, the refractive index of the pyramid pattern layer 111 and the first diffusion layer 123 may be formed such that the absolute value of the difference may be 0.2 or less. As the difference in refractive index between the pyramid pattern layer 111 and the first diffusion layer 123 is formed to be 0.2 or less, when the first sheet 110 and the second sheet 120 are laminated, it may be advantageous to maintain the optimal incident angle (θ) incident to the second sheet 120 disposed above by preventing damage to the pyramid pattern 111a formed on the first sheet 110 disposed below thereby minimizing light separation characteristics and light distribution deformation.

According to various embodiments, the difference in refractive index between the second prism pattern layer 121 and the second diffusion layer 133 may be formed to be greater than 0 and 0.2 or less. The optical film 100 can have high brightness by having a difference in the refractive index of the second prism pattern layer 121 and the second diffusion layer 133 greater than 0 and less than 0.2.

As an example of the above-mentioned refractive index, an optical film 100 including a first sheet 110, a second sheet 120, and a third sheet 130 according to an embodiment of the present disclosure (e.g., the optical film 100c of FIG. 4C) may include the first sheet 110 where a first prism pattern layer 113 has a refractive index of 1.49 and a pyramid pattern layer 111 has a refractive index of 1.49 to 1.69, the second sheet 120 where a first diffusion layer 123 has a refractive index of 1.49, a second prism pattern layer 121 has a refractive index of 1.69, and the third sheet 130 where a second diffusion layer 133 has a refractive index of is 1.49 and a third prism pattern layer 131 has a refractive index of is 1.69. According to an embodiment, while the refractive index for other components is fixed, by appropriately adjusting the refractive index the first prism pattern layer 113 including a reversed prism pattern to be matched with the refractive index of the third prism pattern layer 131 including the uppermost prisms, the optimal incident angle (θ) for light incident to the lower surface of the second sheet can be formed.

Figure 9C:
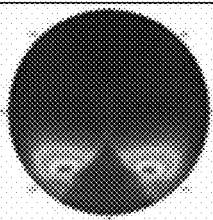
FIG. 9C is a table showing optical characteristics of a liquid crystal display (LCD) device including an optical film according to an embodiment.
Figure 9C:
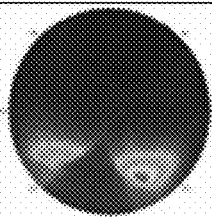
Figure 9C:
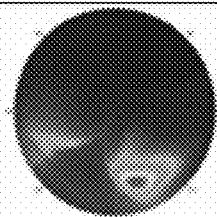
Figure 9C:
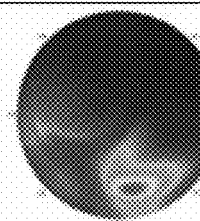
Figure 9C:
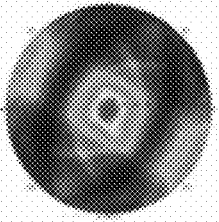
Figure 9C:
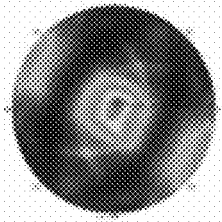
Figure 9C:
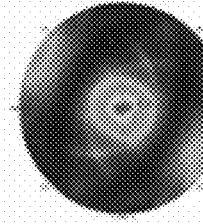
Figure 9C:
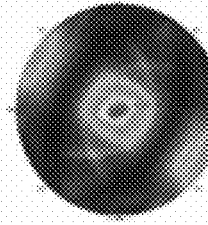
Figure 9D:
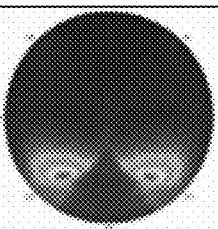
FIG. 9D is a table showing optical characteristics of a liquid crystal display (LCD) device including an optical film according to an embodiment.
Figure 9D:
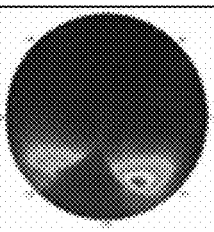
Figure 9D:
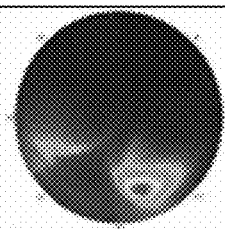
Figure 9D:
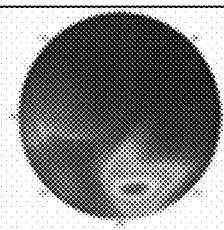
Figure 9D:
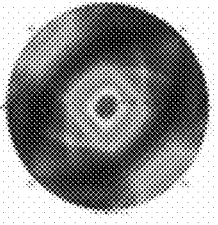
Figure 9D:
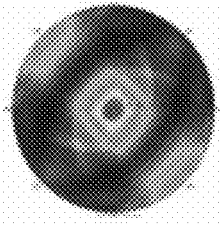
Figure 9D:
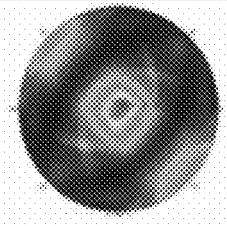
Figure 9D:
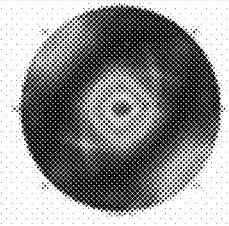

FIG. 9A is a table showing optical characteristics of a liquid crystal display device including an optical film, according to one embodiment. FIG. 9B is a table showing optical characteristics of a liquid crystal display device including an optical film, according to one embodiment. FIG. 9C is a table showing optical characteristics of a liquid crystal display device including an optical film, according to one embodiment. FIG. 9D is a table showing optical characteristics of a liquid crystal display device including an optical film, according to one embodiment.

Embodiments in FIGS. 9A to 9D may represent the optical characteristics and their related data (e.g., Viewing Angle Distribution 1, Viewing Angle Distribution 2, Brightness, Left/Right Incident Angle (θ), and Left/Right Viewing Angle (Φ)) of light measured between the first sheet 110 and the second sheet 120 and measured between the third sheet 130 and the diffusion sheet 17 when the ridge direction P3 of the plurality of third prism patterns included in the third prism pattern layer 131 of the third sheet 130 and the ridge direction P1 of the plurality of first prism patterns included in the first prism pattern layer 113 of the first sheet 110 are set to various ways while the refractive index (Diff PY) of the pyramid pattern layer 111 of the first sheet 110 and the refractive index (Diff P) of the first prism pattern layer 113 are maintained constantly (e.g., the refractive index (Diff PY) of the pyramid pattern layer 111 of the first sheet 110 and the refractive index (Diff P) of the first prism pattern layer 113 are set to 1.49 and 1.49, respectively). Viewing Angle Distribution 1 is intended to represent the viewing angle for light emitted from the first sheet 110 and it may represent the distribution of light formed on a horizontal plane at a point between the first sheet 110 and the second sheet 120 (e.g., a plane parallel to the X-Y plane). Viewing Angle Distribution 2 is intended to represent the viewing angle for light emitted from the entire optical film 100 and it may represent the distribution of light formed on a horizontal plane at a point between the third sheet 130 and the diffusion sheet 17 (e.g., a plane parallel to the X-Y plane). Reviewing FIGS. 9A, 9B, 9C, and 9D, when the refractive index (Diff PY) of the pyramid pattern layer 111 of the first sheet 110 and the refractive index (Diff P) of the first prism pattern layer 113 were widely varied, it can be confirmed that Brightness, Left/Right Incident Angle (θ), and/or Left/Right Viewing Angle (Φ) were also widely varied.

Reviewing the various embodiment ('Example 4-1', 'Example 4-2', 'Example 4-3', and 'Example 4-4') of FIG. 9A, when the ridge direction (P3: the third direction) of a plurality of the third prism patterns of the third prism pattern layer 131 is perpendicular to the arrangement direction (the fourth direction) of the light source 11 and the ridge direction (P1: the first direction) of a plurality of first prism patterns of the first prism pattern layer 113 is also perpendicular to the arrangement direction (the fourth direction) of the light source 11 (i.e., it is parallel to the third direction), it can be confirmed that the brightness value is the highest at 151.6%.

Reviewing the various embodiment ('Example 4-5', 'Example 4-6', 'Example 4-7', and 'Example 4-8') of FIG. 9B, when the ridge direction (P3: the third direction) of a plurality of the third prism patterns of the third prism pattern layer 131 is 75° tilted from the arrangement direction (the fourth direction) of the light source 11 and the ridge direction (P1: the first direction) of a plurality of first prism patterns of the first prism pattern layer 113 is also 75° tilted from the arrangement direction (the fourth direction) of the light source 11 (i.e., it is parallel to the third direction), it can be confirmed that the brightness value is the highest at 148.0%.

Reviewing the various embodiment ('Example 4-9', 'Example 4-10', 'Example 4-11', and 'Example 4-12') of FIG. 9C, when the ridge direction (P3: the third direction) of a plurality of the third prism patterns of the third prism pattern layer 131 is 60° tilted from the arrangement direction (the fourth direction) of the light source 11 and the ridge direction (P1: the first direction) of a plurality of first prism patterns of the first prism pattern layer 113 is also 60° tilted from the arrangement direction (the fourth direction) of the light source 11 (i.e., it is parallel to the third direction), it can be confirmed that the brightness value is the highest at 132.7%.

Reviewing the various embodiment ('Example 4-13', 'Example 4-14', 'Example 4-15', and 'Example 4-16') of FIG. 9D, when the ridge direction (P3: the third direction) of a plurality of the third prism patterns of the third prism pattern layer 131 is 45° tilted from the arrangement direction (the fourth direction) of the light source 11 and the ridge direction (P1: the first direction) of a plurality of first prism patterns of the first prism pattern layer 113 is also 45° tilted from the arrangement direction (the fourth direction) of the light source 11 (i.e., it is parallel to the third direction), it can be confirmed that the brightness value is the highest at 121.8%.

According to an embodiment, by arranging the ridge direction (P3: the third direction) of the plurality of third prism patterns of the third prism pattern layer 131 to be tilted from the arrangement direction (the fourth direction) of the light source 11, it is possible to prevent moiré phenomenon as well as to achieve the high brightness performance by configuring the optical film 100 where the ridge direction (P3: the third direction) of the plurality of third prism patterns of the third prism pattern layer 131 and the ridge direction (P1: the first direction) of the plurality of first prisms of the first prism pattern layer 113 are faced substantially the same direction. That is, according to the present disclosure, the vertex direction (P1) of the plurality of first prism patterns of the first prism pattern layer 113 may be parallel to the vertex direction (P3) of the plurality of third prism patterns of the third prism pattern layer 131.

According to an embodiment, the optical film 100 having three sheets 110, 120, 130 as well as having one sheet 110 (e.g., the optical film 100a in FIG. 4A) and two sheets 110, 120 (e.g., the optical film 100b in FIG. 4B) may also be included in the scope of the present disclosure.

Figure 10A:
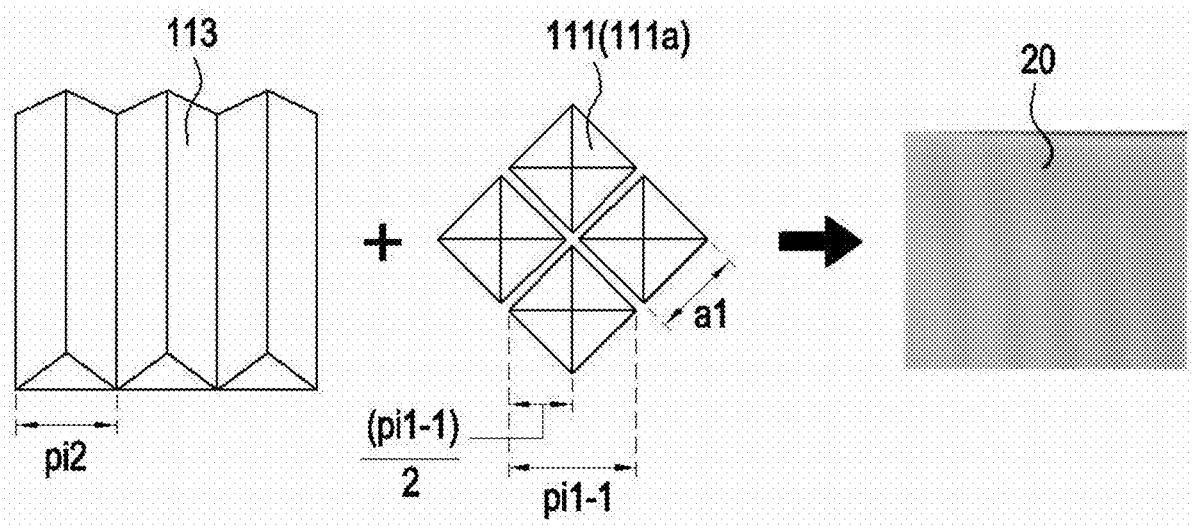
FIGS. 10A and 10B are liquid crystal panel images and drawings showing the arrangement of a first prism pattern layer and a pyramid pattern layer according to an embodiment.
Figure 10B:
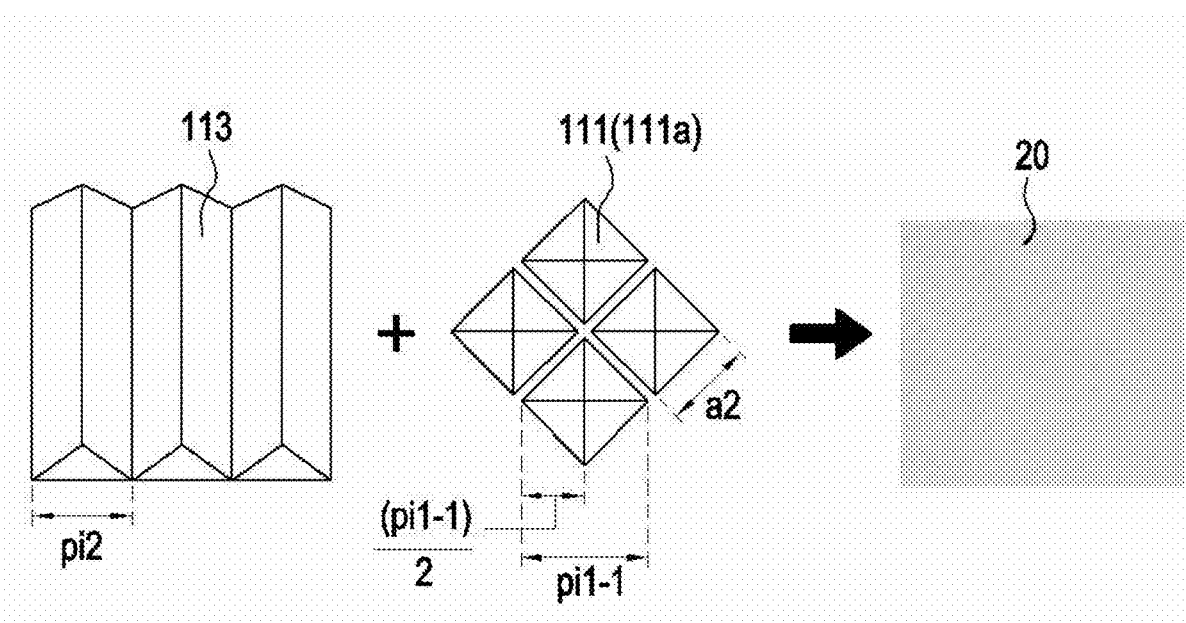

The moiré phenomenon can also be prevented in the optical film 100a. FIG. 10A is a liquid crystal panel image and drawings showing the first prism pattern layer 113 and the pyramid pattern layer 111 arrangement in a sheet 110. FIG. 10B is a liquid crystal panel image and drawings showing the first prism pattern layer 113 and the pyramid pattern layer 111 arrangement according to an embodiment.

The moiré phenomenon may be easily occurred or never occurred by varying a parameter and/or a pattern arrangement of the pyramid pattern 111a of the pyramid pattern layer 111 and the prism pattern of the first prism pattern layer 113 (or the reversed prism pattern layer).

For example, as shown in FIGS. 10A and 10B, when the pyramid pattern 111a of the pyramid pattern layer 111 and the prism pattern of the first prism pattern layer 113 are arranged, the moiré phenomenon may be easily occurred or never occurred depending on the difference between the parameter of the pyramid pattern 111a and the parameter of the prism pattern (referred to as 'numerical difference in parameters'). Here, the parameter may be, for example, a parameter for length, and in this case, for example, 'numerical difference in parameters' may mean the difference between the pitch of the pyramid pattern and the pitch of the prism pattern.

According to an embodiment of the present disclosure, the pyramid pattern layer 111 may include a plurality of pyramid patterns 111a with a first pitch "pi1" and the first prism pattern layer 113 (or the reversed prism pattern layer) may include a plurality of prism patterns with a second pitch "pi2". Here, the first pitch "pi1" of the pyramid pattern 111a may be defined as the length of the sides "a1" and "a2" of the pyramid base. The difference in the numerical values of the patterns may mean the difference between the first pitch "pi1" and the second pitch "pi2."

On the other hand, if the pyramid direction of one side of the pyramid base of the pyramid pattern 111a and the prism direction of the ridge of the prism pattern does not form 0° or 90° but forms more than a predetermined angle (e.g.) 30°, the numerical difference between the patterns can be compared with a first prime pitch "pi1-1" corresponding to a diagonal length of the pyramid base of the pyramid pattern 111a rather than the first pitch "pi1" corresponding to the length of the side of the pyramid base of the pyramid pattern 111a. In an embodiment of FIGS. 10A and 10B, it can be disclosed whether the moiré phenomenon may be occurred when the half of the diagonal length "(pi1−1)/2" of the pyramid base of the pyramid pattern 113a, not the side lengths of the pyramid base "a1", "a2" of the pyramid pattern 113a, is compared with the pitch "pi2" of the prism pattern.

For example, the moiré phenomenon may be occurred in the liquid crystal panel 20 shown in FIG. 10A, but the moiré phenomenon may not be occurred in the liquid crystal panel 20 shown in FIG. 10B. For example, FIG. 10A shows that the moiré phenomenon is occurred when the pitch "pi2" of the prism pattern is 21 µm, the side length of the pyramid base of the pyramid pattern is 30 µm, and the half of the diagonal length of the pyramid pattern is 21.21 µm. For another example, FIG. 10B shows that the moiré phenomenon is not occurred when the pitch "pi2" of the prism pattern is 17 µm, the side length of the pyramid base of the pyramid pattern is 30 µm, and the half of the diagonal length of the pyramid base of the pyramid pattern is 21.21 µm. Through this, it can be confirmed that the moiré phenomenon may be occurred when the length of a certain parameter of the pyramid pattern (e.g., half of the diagonal length) and the pitch length of the prism pattern are similar, and that the moiré phenomenon may not be occurred when the length of the pitch of the prism pattern is similar.

The pitch relationship at which the moiré phenomenon is not occurred for the optical film 100 can be summarized in Formulas as follows. To prevent the moiré phenomenon from being occurred for the optical film 100, Formula 1 or Formula 2 below must be satisfied:

$$\frac{n \cdot (pi1 - 1)}{2} < pi2 < n \cdot pi1 \quad \text{[Formula 1]}$$

$$\frac{n \cdot (pi1 - 1)}{2} > pi2 \quad \text{[Formula 2]}$$

Here, "n" may be a natural number.

In some embodiments of the present specification, when the pitch of the pyramid pattern and the pitch of the prism pattern are similar, the term 'similar' means, for example, if they have the same value when the value below the decimal point at two different pitches in micrometers (µm) was discarded, they can be said to be similar. Alternatively, the term 'similar' may be said to be similar when, for example, the difference between two different pitches is less than 3% of the total pitch length of one pattern.

The optical film of various embodiments of the present disclosure described above and the backlight unit including the optical film are not limited to the above-described embodiments and drawings. Moreover, various substitutions, modifications, and changes are possible for those skilled in the art within the technical scope of the present disclosure. The effects that can be obtained from the present disclosure are not limited to the effects mentioned above, and other effects not mentioned can be clearly understood by those skilled in the art from the description above.

The invention claimed is:

1. An optical film comprising:
   a first sheet including a first base portion; a pyramid pattern layer including a plurality of pyramid patterns formed on a first surface of the first base portion wherein each pyramid pattern has a first pitch corresponding to a length of a first side of a pyramid base of the pyramid pattern and a first prime pitch corresponding to a diagonal length of the pyramid base of the pyramid pattern; and a first prism pattern layer including a plurality of first prisms patterns formed on a second surface of the first base portion wherein each first prism pattern has a second pitch corresponding to a prism base length of the first prism pattern;
   a second sheet including a second base portion; a second prism pattern layer including a plurality of second prism patterns formed on a first surface of the second base portion; and a first diffusion layer formed on a second surface of the second base portion wherein the first diffusion layer is disposed over the first sheet facing the pyramid pattern layer; and
   a third sheet including a third base portion; a third prism pattern layer including a plurality of third prism patterns formed on a first surface of the third base portion; and a second diffusion layer formed on a second surface of the third base portion wherein the second diffusion layer is disposed over the second sheet facing the second prism pattern layer,
   wherein ridges of the plurality of the first prism patterns are formed along a first direction; a direction extended from the side of the pyramid base of the pyramid pattens forms an angle with the first direction in a range of 0° or greater and 45° or less; ridges of the plurality of the second prism patterns are formed along a second direction substantially perpendicular to the first direction; and ridges of the plurality of the third prism patterns are formed along a third direction substantially perpendicular to the second direction.

2. The optical film of claim 1, wherein the second sheet and the third sheet are laminated.

3. The optical film of claim 1, wherein the first, the second sheet and the third sheet are laminated.

4. The optical film of claim 1, wherein the first sheet refracts or reflects a light incident to the second surface of second base portion of the second sheet with a predetermined angle.

5. The optical film of claim 1, wherein an absolute value of a difference of a refractive index of the pyramid pattern layer and a refractive index of the first prism pattern layer is 0.2 or less.

6. The optical film of claim 1, wherein the optical film satisfies either Formula 1 or Formula 2:

$$\frac{n \cdot (pi1 - 1)}{2} < pi2 < n \cdot pi1 \quad \text{[Formula 1]}$$

or $$\frac{n \cdot (pi1 - 1)}{2} > pi2, \quad \text{[Formula 2]}$$

wherein pi1 is the first pitch; pi1-1 is the first prime; pi2 is the second pitch; and n is a natural number.

7. A backlight unit comprising:
an edge type light source; and
an optical film disposed over the light source further comprising:
a first sheet including a first base portion; a pyramid pattern layer including a plurality of pyramid patterns formed on a first surface of the first base portion wherein each pyramid pattern has a first pitch corresponding to a length of a first side of a pyramid base of the pyramid pattern and a first prime pitch corresponding to a diagonal length of the pyramid base of the pyramid pattern; and a first prism pattern layer including a plurality of first prisms patterns formed on a second surface of the first base portion wherein each first prism pattern has a second pitch corresponding to a prism base length of the first prism pattern;
a second sheet including a second base portion; a second prism pattern layer including a plurality of second prism patterns formed on a first surface of the second base portion; and a first diffusion layer formed on a second surface of the second base portion wherein the first diffusion layer is disposed over the first sheet facing the pyramid pattern layer; and
a third sheet including a third base portion; a third prism pattern layer including a plurality of third prism patterns formed on a first surface of the third base portion; and a second diffusion layer formed on a second surface of the third base portion wherein the second diffusion layer is disposed over the second sheet facing the second prism pattern layer,
wherein ridges of the plurality of the first prism patterns are formed along a first direction; a direction extended from the side of the pyramid base of the pyramid pattens forms an angle with the first direction in a range of 0° or greater and 45° or less; ridges of the plurality of the second prism patterns are formed along a second direction substantially perpendicular to the first direction; and ridges of the plurality of the third prism patterns are formed along a third direction substantially perpendicular to the second direction.

8. The backlight unit of claim 7, wherein the edge type light source is arranged in a fourth direction substantially perpendicular to the first direction and the edge type light source emits a light substantially parallel to the first direction.

9. The backlight unit of claim 7, wherein the edge type light source is arranged in the fourth direction; the first direction is tilted with a first angle from the fourth direction; and the third direction is substantially parallel to the first direction and tilted with a second angle which is substantially the same as the first angle from the fourth direction.

10. The backlight unit of claim 7, wherein the optical film satisfies either Formula 3 or Formula 4:

$$\frac{n \cdot (pi1 - 1)}{2} < pi2 < n \cdot pi1 \quad \text{[Formula 3]}$$

or $$\frac{n \cdot (pi1 - 1)}{2} > pi2, \quad \text{[Formula 4]}$$

wherein pi1 is the first pitch; pi1-1 is the first prime; pi2 is the second pitch; and n is a natural number.

11. An optical film comprising:
a first sheet including a first base portion; a pyramid pattern layer including a plurality of pyramid patterns formed on a first surface of the first base portion wherein each pyramid pattern has a first pitch corresponding to a length of a first side of a pyramid base of the pyramid pattern and a first prime pitch corresponding to a diagonal length of the pyramid base of the pyramid pattern; and a first prism pattern layer including a plurality of first prisms patterns formed on a second surface of the first base portion wherein each first prism pattern has a second pitch corresponding to a prism base length of the first prism pattern,
wherein ridges of the plurality of the first prism patterns are formed along a first direction and a direction extended from the side of the pyramid base of the pyramid pattens forms an angle with the first direction in a range of 0° or greater and 45° or less; and
wherein the optical film satisfies either Formula 5 or Formula 6:

$$\frac{n \cdot (pi1 - 1)}{2} < pi2 < n \cdot pi1 \quad \text{[Formula 5]}$$

or $$\frac{n \cdot (pi1 - 1)}{2} > pi2, \quad \text{[Formula 6]}$$

wherein pi1 is the first pitch; pi1-1 is the first prime; pi2 is the second pitch; and n is a natural number.

12. The optical film of claim 11, wherein an absolute value of a difference of a refractive index of the pyramid pattern layer and a refractive index of the first prism pattern layer is 0.2 or less.

13. A backlight unit comprising:
an edge type light source; and
an optical film disposed over the light source, the optical film comprising:
a first sheet including a first base portion; a pyramid pattern layer including a plurality of pyramid patterns formed on a first surface of the first base portion wherein each pyramid pattern has a first pitch corresponding to a length of a first side of a pyramid base of the pyramid pattern and a first prime pitch corresponding to a diagonal length of the pyramid base of the pyramid pattern; and a first prism pattern layer including a plurality of first prisms patterns formed on a second surface of the first base portion wherein each first prism pattern has a second pitch corresponding to a prism base length of the first prism pattern, wherein ridges of the plurality of the first prism patterns are formed along a first direction and a direction extended from the side of the pyramid base of the pyramid pattens forms an angle with the first direction in a range of 0° or greater and 45° or less; and wherein the optical film satisfies either Formula 5 or Formula 6:

$$\frac{n \cdot (pi1 - 1)}{2} < pi2 < n \cdot pi1 \quad \text{[Formula 5]}$$

or $$\frac{n \cdot (pi1 - 1)}{2} > pi2, \quad \text{[Formula 6]}$$

wherein pi1 is the first pitch; pi1-1 is the first prime; pi2 is the second pitch; and n is a natural number.

14. The backlight unit of claim 13, wherein an absolute value of a difference of a refractive index of the pyramid pattern layer and a refractive index of the first prism pattern layer is 0.2 or less.

* * * * *